(12) United States Patent
Cunningham et al.

(10) Patent No.: US 11,128,143 B2
(45) Date of Patent: *Sep. 21, 2021

(54) SYSTEM AND METHOD FOR INSTALLING SOLAR PANELS

(71) Applicant: SafeConnect Solar, Inc., Honolulu, HI (US)

(72) Inventors: Brian Cunningham, Wilbraham, MA (US); Todd Georgopapadakos, Honolulu, HI (US); Mark Duda, Honolulu, HI (US); Scott Sato, Honolulu, HI (US)

(73) Assignee: SafeConnect Solar, Inc., Honolulu, HI (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/431,340

(22) Filed: Jun. 4, 2019

(65) Prior Publication Data

US 2019/0288518 A1    Sep. 19, 2019

Related U.S. Application Data

(60) Division of application No. 15/270,126, filed on Sep. 20, 2016, now Pat. No. 10,367,357, which is a continuation-in-part of application No. 13/964,485, filed on Aug. 12, 2013, now Pat. No. 9,929,561, which is a continuation-in-part of application No. 13/927,776, filed on Jun. 26, 2013, now Pat. No. 9,742,188.

(51) Int. Cl.
| | |
|---|---|
| H02J 3/46 | (2006.01) |
| H02S 40/34 | (2014.01) |
| H02J 3/38 | (2006.01) |
| H02J 1/12 | (2006.01) |

(52) U.S. Cl.
CPC .............. *H02J 3/46* (2013.01); *H02J 1/12* (2013.01); *H02J 3/383* (2013.01); *H02S 40/34* (2014.12); *Y02E 10/56* (2013.01)

(58) Field of Classification Search
CPC .............. H02J 1/12; H02J 3/383; Y02E 10/56
See application file for complete search history.

*Primary Examiner* — Daniel Kessie
(74) *Attorney, Agent, or Firm* — Polsinelli PC

(57) ABSTRACT

A solar panel system for determining how many solar panels connected to a controller is provided. An electrical pathway connects the controller to at least one solar panel. A first resistance is associated with each of the at least one solar panel. An external environment resistance is defined by a cumulative presence of at least the first resistance associated with each of the at least one solar panel, wherein the external environment resistance is different based on a total number of the at least one solar panels connected to the electrical pathway. A second resistance is associated with the controller. The external environment resistance and the second resistance at least partially define a voltage divider to receive an input voltage and produce an output voltage. The controller is programmed to determine from the produced output voltage the total number of the at least one solar panel connected to the controller along the electrical pathway.

12 Claims, 30 Drawing Sheets

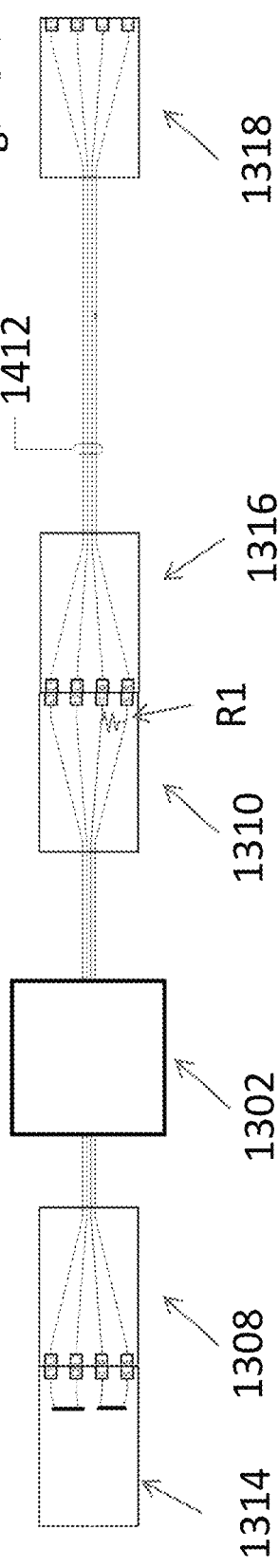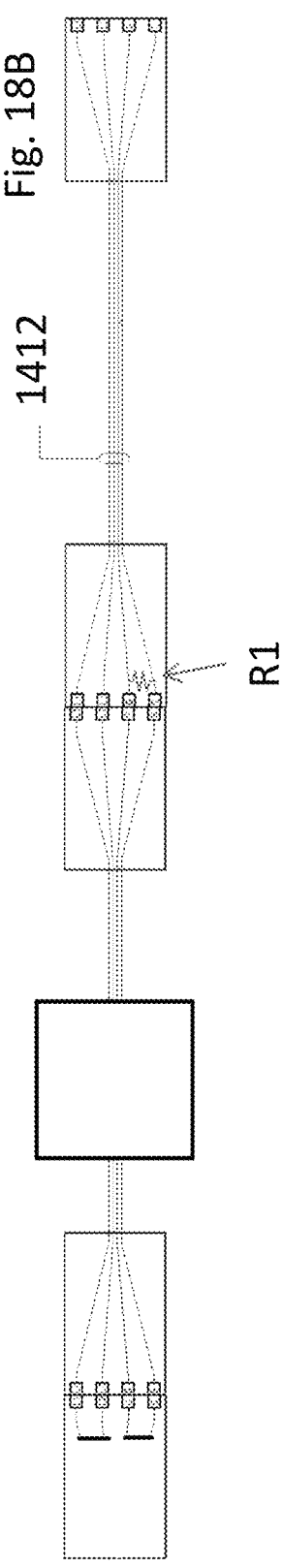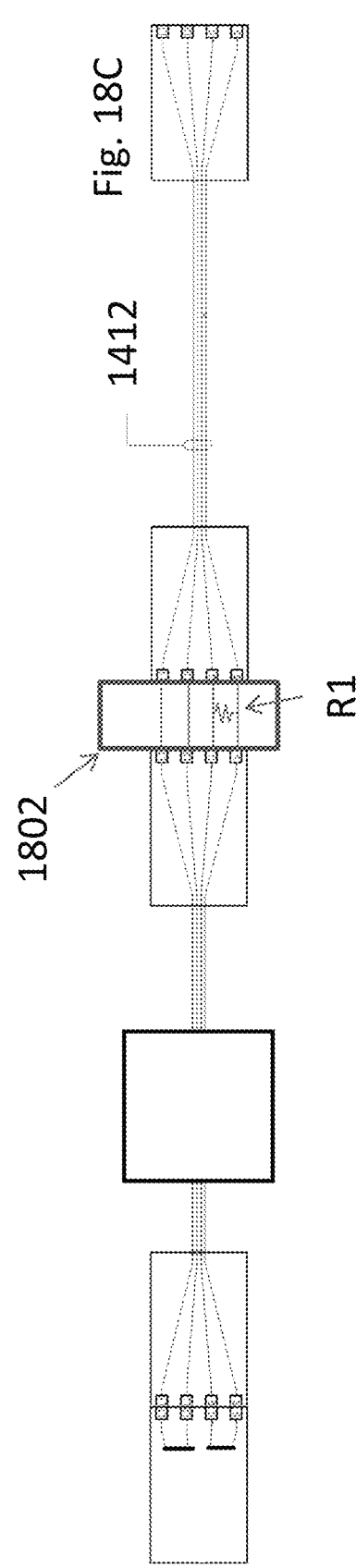

SYSTEM AND METHOD FOR INSTALLING SOLAR PANELS

CROSS REFERENCE TO RELATED APPLICATIONS

The instant application is a divisional and claims priority to U.S. Ser. No. 15/270,126 filed on Sep. 20, 2016, which is a continuation-in-part and claims priority to U.S. Ser. No. 13/964,485 filed on Aug. 12, 2013, which is a continuation-in-part and claims priority to U.S. Ser. No. 13/927,776 filed Jun. 26, 2013, all entitled System and Method for Installing Solar Panels, the contents of which are expressly incorporated herein in their entireties.

FIELD OF THE INVENTION

The various embodiments described herein relate generally to the installation of solar panels. More specifically, the instant application relates to a methodology for installing solar panels that minimizes or eliminates the need for specialized training or knowledge in electrical power systems.

BACKGROUND

Solar technology presents a viable green source of energy as an alternative to fossil fuels. This is particularly the case for geographic areas that have a high amount of daylight and/or higher than average fuel costs, such as Hawaii.

An ongoing obstacle to the adoption of solar panels as a home energy solution remains the expense, particularly in the purchase of the components and the installation. A typical residential solar system, will include a number of solar panels connected by electrical cables to a junction box. The output of the junction box is then fed to load distribution center for internal use. Electrical cable between the solar panels and the junction box are cut to length, and spliced ends of the wires are connected to terminals using generally known methodologies familiar to the field of electricians.

A drawback of the above system is that the total maximum output of the panels must not exceed the capacity of the home's existing electrical service, in that having an output in excess of capacity can damage the system and/or present a safety hazard. However, different solar panels have different outputs and different homes have different capacities. The underlying calculations on the appropriate number of panels are generally known by electricians and professional solar panel installers, but are not typically known by a typical consumer. Many consumers are also not familiar with how to make safe electrical grade connections between components and/or lack the tools to do so. Jurisdictions thus often require professional installers to install solar panel systems to ensure safe and proper installation, which adds to the overall installation costs. In general, any wired in place solar or electrical system must be installed by a licensed electrical contractor.

BRIEF DESCRIPTION OF THE DRAWINGS

Various embodiments in accordance with the present disclosure will be described with reference to the drawings, in which:

FIGS. 18A-C show different embodiment of resistor placement in the embodiment of FIG. 15.

FIG. 22 illustrates another embodiment of resistor placement in the embodiment of FIG. 21.

DETAILED DESCRIPTION

In the following description, various embodiments will be illustrated by way of example and not by way of limitation in the Figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Because of safety concerns, any wired in place solar or electrical system is typically installed by a licensed electrical contractor. Embodiments herein provide methodologies and architecture that address those safety concerns. Embodiment herein can thus reduce or eliminate the need for onsite engineering and allow anyone to safely connect and install a solar panel system.

Embodiments of the invention herein provide a "plug and play" solar panel installation methodology that requires little or no reliance on professional electricians or installers. End consumers can thus install the systems on their own, thereby reducing the overall installation costs.

Figure 1:
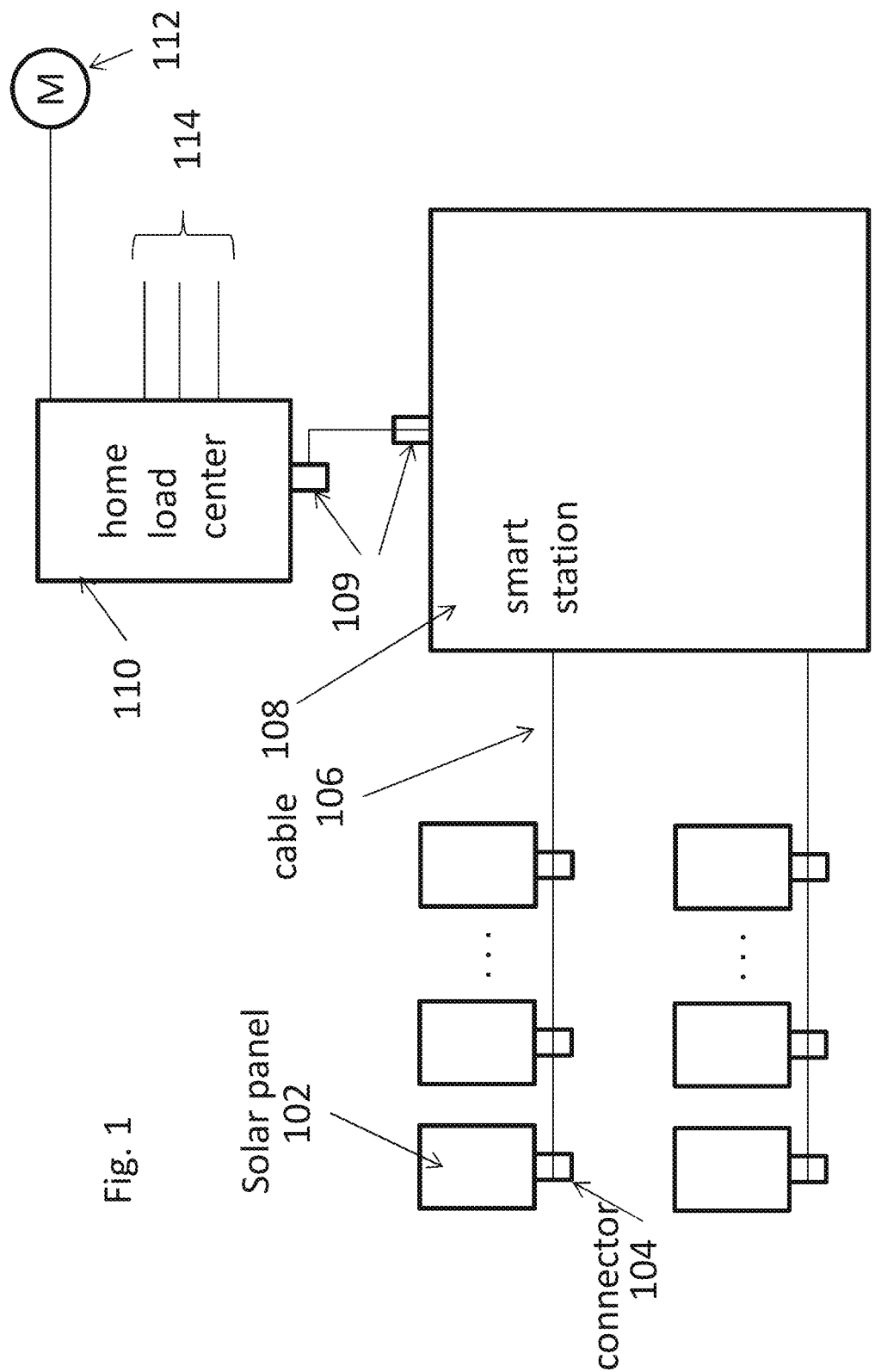
FIG. 1 illustrates an environment of an embodiment of the invention.

Referring now to FIG. 1, an embodiment of a deployed solar panel system is shown. Solar panels 102 are an originating source of electrical power. Each panel 102 includes an interface adaptor 104 that connects to branches of a cable 106. Cable 106 also connects to smart station 108 (which may be generically considered a system controller), discussed in more detail below. Smart station 108 in turn connects to a home load center 110 through a connector 109. Home load center 110 in turn connects to a utility meter 112 and/or other electrical leads 114.

Figure 2:
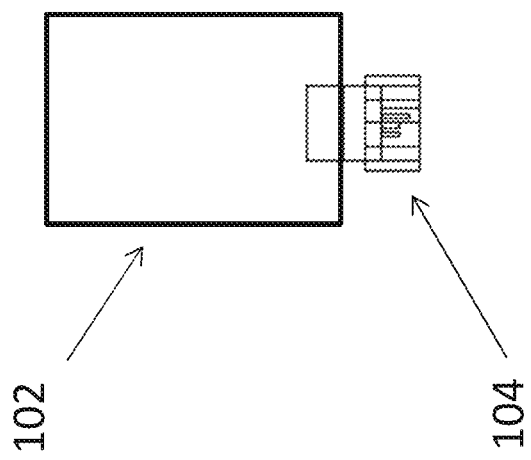
FIG. 2 illustrates a solar panel according to an embodiment of the invention.

Referring now to FIG. 2, an embodiment of solar panel 102 and adaptor 104 is shown (not to scale—panel 102 would typically be considerably larger). Adaptor 104 is preferably the only electrical conduit through which power from panel 102 is sent downstream. Adaptor 104 is also preferably mounted to or otherwise integral with panel 102.

Figure 3:
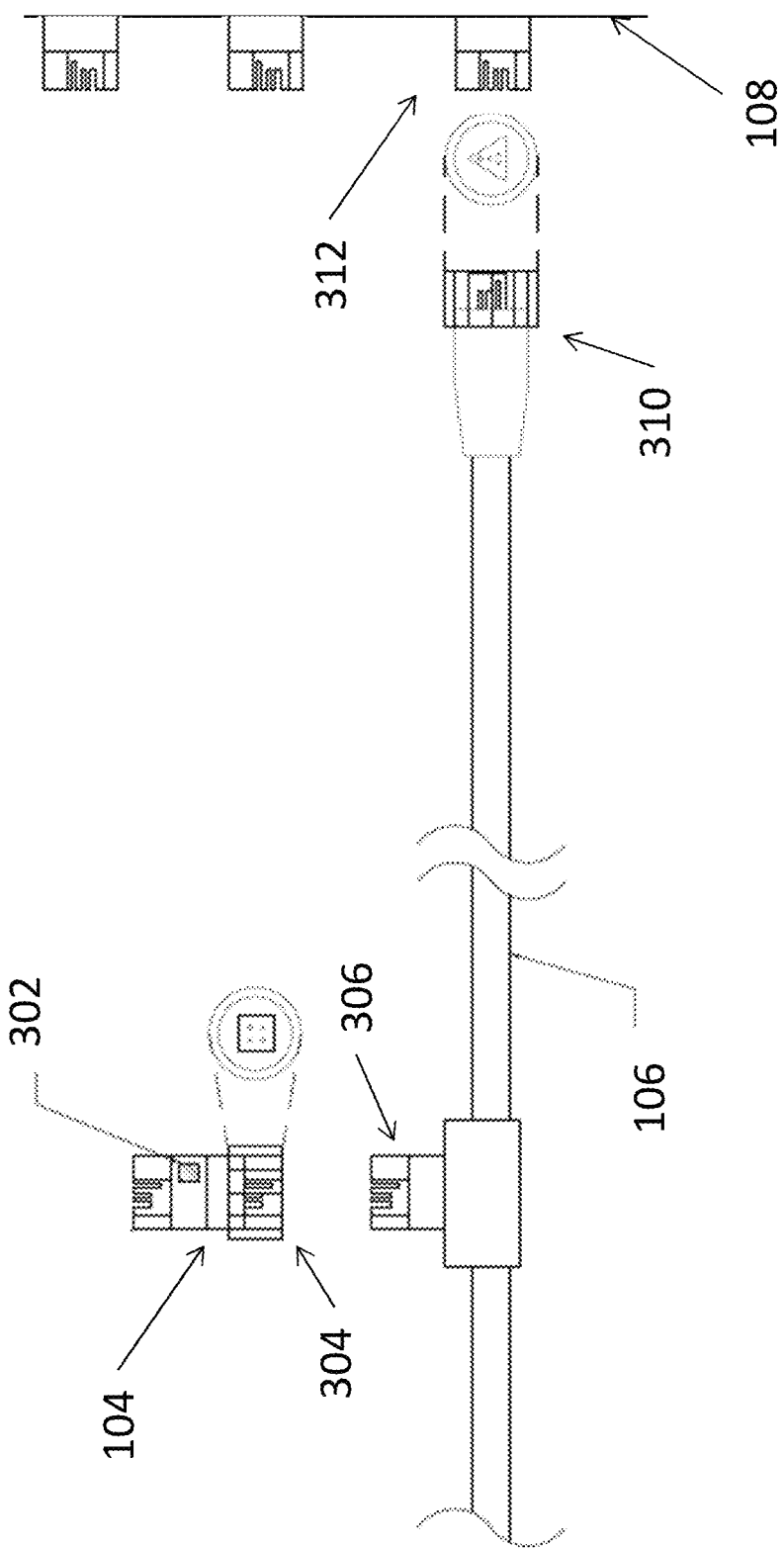
FIG. 3 illustrates a cable connecting to various components according to an embodiment of the invention.

Referring now to FIG. 3, an embodiment of adaptor 104 relative to cable 106 is shown. Adaptor 104 may include a data source 302. Data source 302 is preferably a programmed integrated circuit, but this need not be the case and data source 302 may be any other form of hardware and/or software data source. The invention is not limited to any physical embodiment of data source 302.

Data source 302 preferably includes information about the solar panel 102 to which data source 302 is connected, such information being stored or generated on an as needed basis. Such information may include the rated wattage of the solar panel 102 that data source 302 is associated with. In addition and/or the alternative, such information may include an identifier or marker. Such information may also contain other identification information that may be of use, such as the manufacturer, although such information may not be necessary for operation of the embodiment. The invention is not limited to any particular type of data stored and/or generated by data source 302, or the format of such data. Data source 302 may receive power from the panel 102 directly, through a local battery, or via feedback from smart station 108 or other downstream elements. Data source 302 may also be a passive device that requires no independent power, but which can impart its information by modulating other signals that react therewith.

Adaptor 104 also preferably includes a connector 304 with various pins and/or slots configured to mate with a corresponding branch connector 306 of cable 106. The various pathways provided by the pins and/or slots will be appropriate to convey power from panels 102 to smart station 108, as well as the requisite information from data source 302.

The shape of the connectors 304/306 may have various generic or unique features. At a minimum, each connector combination 304/306 is preferably of a plug in type, i.e., connector 306 can mate with connector 304 by simply physical contact or insertion, and without the need to strip any wires. This provides a "plug and play" feature that allows installation without specific knowledge of safely stripping and connecting electrical cable with electrical terminals.

Connectors 306 may be at preset positions along cable 106. In the alternative, connectors 306 may be snap on components that the consumer can connect to the cable during installation at desired customized positions.

The shape and configuration of connectors 304/306 could be universal to any particular solar panel 102 with adaptor 104. In the alternative the combination could be unique to panels of common rated outputs. By way of non-limiting example, a square arrangement of connectors 304/306 could be used for a panel rated for 50 watts, while a triangular arrangement could be for panels of 100 watts. The number of branch connectors 306 in combination with the unique shape of the connectors can collectively limit the total output of an array of panels 102 to smart station 108. By way of non-limiting example, a cable 106 with sixteen (16) branch points with connectors 306 having a shape specific to 200 watt panels 102 would have a maximum limit of 3.2 kW, and could be used safely with systems that could handle such capacity. Not every connector 306 need be connected to panels, and unused connectors 306 are preferably covered by a weather resistant cap.

Cable 106 also includes a connector 310 at the end that connects to smart station 108, which has a mating connector or conduit 312. At a minimum, each connector combination 310/312 is preferably of a plug in type, i.e., connector 310 can mate with connector 312 by simple physical contact or insertion, and without the need to strip any wires. This provides a "plug and play" feature that allows installation without specific knowledge of how to safely strip and connect electrical cable with electrical terminals.

Cable 106 may also include an equipment-grounding conductor as well as optional grounding electrode conductor. The equipment ground conductor would connect to the equipment ground that comes out of the module, and would ultimately be grounded through the grounding of the home's existing electrical system. The grounding electrode conductor would be connected to a separate ground connection and will ultimately be grounded through a separate grounding rod not attached to the home's existing electrical service.

Figure 4:
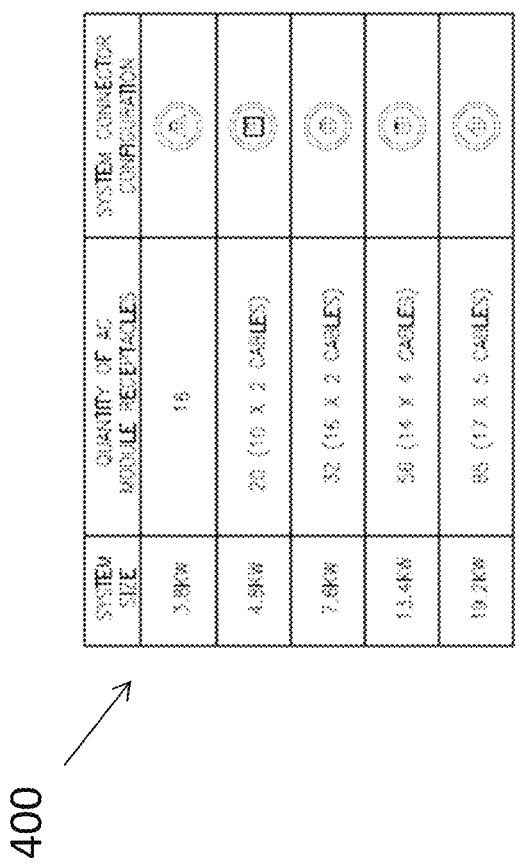
FIG. 4 illustrates a table of possible shapes of connectors based on system capacity according to an embodiment of the invention.

The shape and configuration of connectors 310/312 could be universal to any smart station 108. In the alternative, connector combination 310/312 is preferably unique to the system size as dictated by the smart station 108. By way of non-limiting example, a trapezoid arrangement could be used for a system rated for 3.8 kilowatts, while a hexagon could be for systems of 13.4 kilowatts. FIG. 4 shows a table 400 of non-limiting examples of different connector configurations for different system ratings. The invention is not limited to any particular design or system size. The only guiding principles are that preferably (1) different system sizes have different shaped connectors 310/312, and (2) connectors 310/312 have different shapes than connectors 304/306 that connect panels 102 and cable 106. In addition and/or alternative to different shapes, different colors could also be used.

The number of branched connectors 306 in combination with a unique connection mechanism collectively limit the total output of an array of panels 102 to smart station 108.

By way of non-limiting example, a cable 104 with sixteen (16) branch points with connectors 306 specific to 200 watt panels 102 would have a maximum limit of 3.2 kW, and could be used safely with systems that could handle such capacity.

Figure 5:
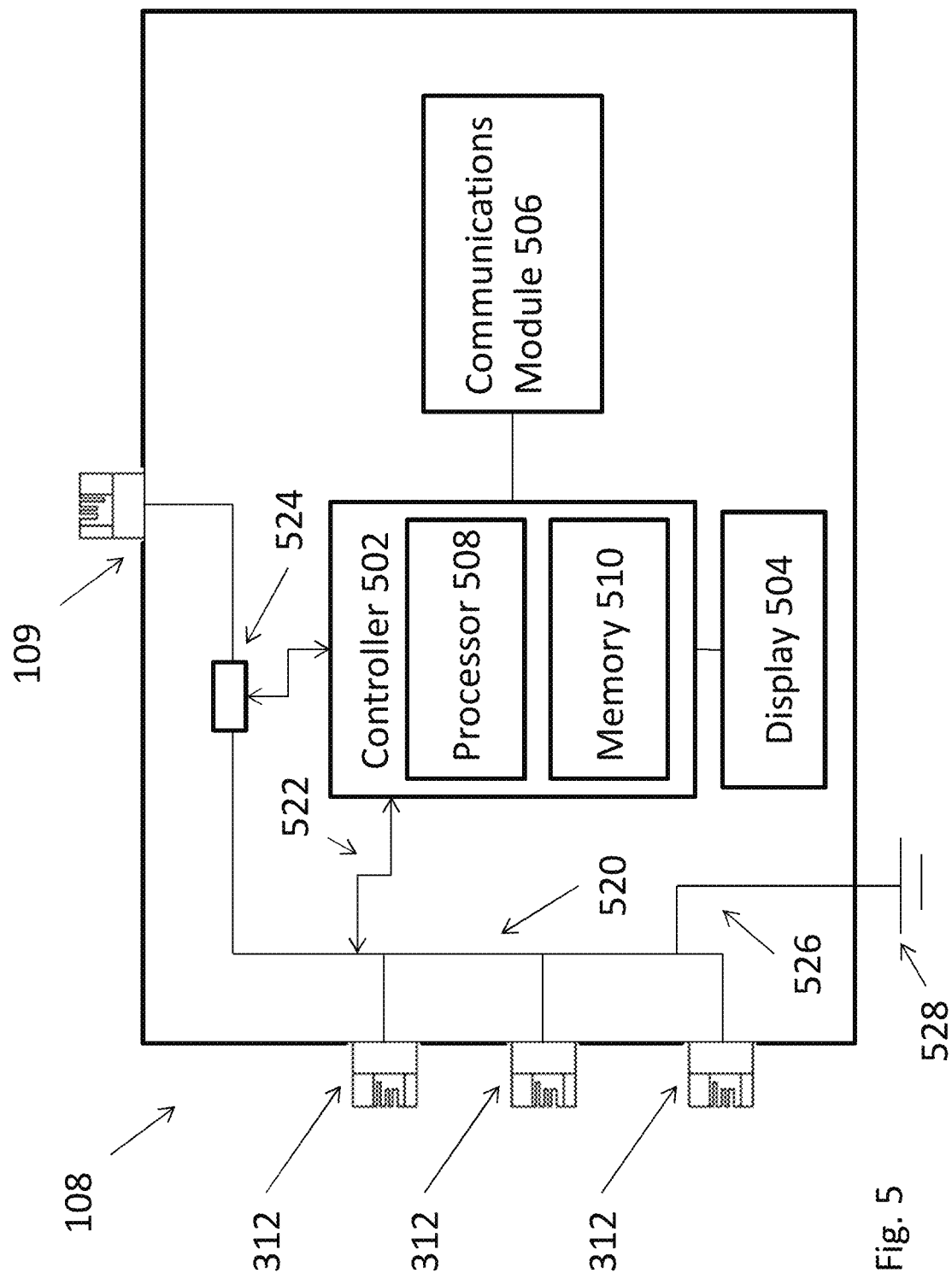
FIG. 5 illustrates an embodiment of a smart station.

As shown in FIG. 5, smart station 108 may have multiple connectors 312 to connect to multiple cables 106. Three are shown in FIG. 5, but there may be any number of connectors 312 (including only a single connector 312) as appropriate for the system. Each of the connectors 312 preferably has the same structure; along with the specific cables 106, this would ensure that each connector 312 connects to the same maximum array of panels 102. However, this need not be the case, and different connectors 312 may be used. The total number of connectors 312 is preferably system specific, e.g., if a smart station 108 can handle 60 panels of a certain type, then three connectors 312 configured to mate with cables 106 that support 20 panels of that type may be appropriate. However, this need not be the case, and there may be more connectors 312.

Alternatively, smart station 108 might have connectors 312 of different types/structures. The smart station would allow the user to select just one, or an appropriate subset, of the multiple connectors 312. Selecting a single connector 312 or an appropriate subset of connectors 312 would preferably disable the other connectors 312. This potentially allows a universal smart station 108 that could be used safely for different system sizes.

Referring now to FIG. 5, a schematic of various control elements of smart station 108 is shown. The smart station 108 has at least one connector 312 to connect to different cables 106 as appropriate. Connectors 312 preferably connect to connector 109 through a power pathway 520; connector 109 ultimately connects to the home load center 110 through a regulation component 524 to deliver power from the array of solar panels 102 for end use. Connector 109 preferably also has a unique shape that is matched to the system, but this need not be the case, and may represent conventional electrical leads. A ground 526 also connects to power pathway 520 via ground pathway 526 for grounding purposes as discussed herein. Connector 109 can also act as the ground path via the homes load center 110.

Smart station 108 also may include a controller 502, a communications module 506, and a display 504. Controller 502 may include a processor 508 and a memory 510. The various components may be any combination of electronic computer hardware and/or software as needed to effectuate the functionality of smart station 108 as discussed herein. The components, which may be integral or distinct, are connected using known methodologies and are not discussed further herein.

As noted above, cable 106 includes structure to carry information signals from the data sources 302 in the panels 102. These signals reach controller 502 via a signal pathway 522. As discussed in more detail below, controller 502 analyzes the signals and may enable or disable the system based upon system status. Signal pathway 522 is shown as a bidirectional pathway, but it may be unidirectional.

Controller 502 may be programmed with certain maximum/minimum parameters of the system. For example, controller 502 may be programmed with a maximum number of panels 102 and/or maximum amount of wattage that the system can support. Controller 502 may also be in communication with the data sources 302 of the panels 102. Since the data source 302 may include information about the corresponding panel 102, system controller 502 can determine whether the complete system connections are within the maximum parameters, and disable the system when this is not the case. For example, system controller 502 can determine whether too many panels 102 are connected, or whether the total rated wattage of the connected panels 102 exceed what the system can handle. Controller 502 can also monitor the presence of ground fault errors, loss of grounding continuity, over-current and/or over-voltage. These are exemplary only, and the invention is not limited to any particular system parameter(s) that controller 502 monitors and/or reacts to.

Regulator element 524 can be used for system control. Regulator 524 may be a simple switch under control from controller 502. Controller 502 can thus enable or disable the flow of power through smart station 108. Alternatively, controller 502 could instruct panel 102 to shutdown via data source 302. The structure of such components are known to those of skill and not further detailed herein.

Controller 502 also may be programmed to monitor the output current of the array of panels 102. As discussed below, it is possible for the array of panels 102 to generate higher output than system capacity. In such a case, controller 502 could disable the system, or otherwise govern the output fed to home load center 110 back to within acceptable levels. In theory some element would need to monitor this collective power flow for controller 502 to make the appropriate decision; regulator element 524 could by way of non-limiting example include an ammeter that monitors the collective power flow and informs controller 502.

Controller 502 could also attempt to rectify the problem by altering the electrical layout of the system. For example, control 502 could shut down one or more of connectors 312. In another example, control 502 could instruct one or more adaptors 104 to disconnect or reduce the power flow from their corresponding panels 102; selective deactivation of adaptors 104 may identify a "problem" panel 102. In addition and/or the alternative, adaptors 104 could monitor the flow of electricity of the panel and on its own authority shut down the power connection if the output of the panel exceeds the rated wattage. Such intelligent capability may also be incorporated in the same integrated circuitry of adaptor 104 that supports data source 302.

Figure 6:
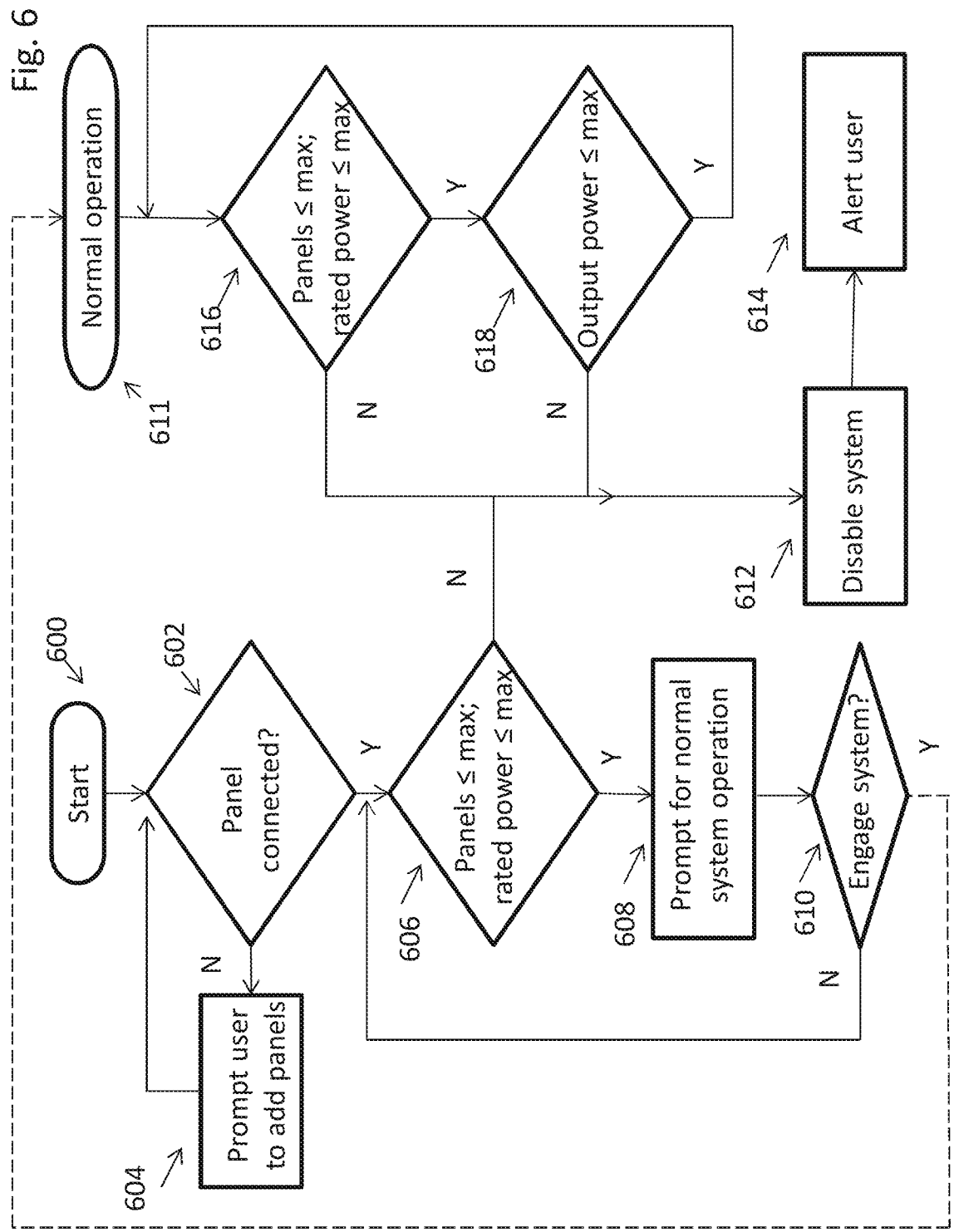
FIG. 6 illustrates a flowchart of the operation of a smart station according to an embodiment of the invention.

Referring now to FIG. 6, a flowchart of an example of a methodology for controller 502 is shown. At step 600, the system starts and initializes. As part of this initialization, the continuity of the equipment grounding conductor between smart station 108 and panels 102 may be tested. At step 602, controller 502 detects whether or not at least one panel is connected to the system; such detection may be via information of the data sources 302 of an attached panel 102, or the simple detection of a power output from a panel 102. If no panel is connected, the user is prompted at step 604 to attach additional panels, and control returns to step 602; this cycle loops until a panel is detected, at which point control passes to step 606. The prompt at 604 may be via display 504, or a signal sent through communications module 506 to a remote device. In another embodiment, steps 602 could be configured to determine if a pre-set number of panels 102 have been reached, and prompts the user to add panels until that number is achieved.

At step 606, controller 502 confirms that the connected panels 102 are within the operating system parameter(s). The controller 502 preferably determines this based on the information from the connected data sources 302 relative to a stored threshold, which may be a data table. For example, if the parameter is a number of panels, then controller 502 counts the number of data sources 302 that it receives signals from (this may be a direct count, or an indirect count based on data taken from the information received from the data sources 302). If the parameter is the total rated wattage, then controller 502 adds the rated wattages of the panels as received from data sources 302. These accumulated value(s) are then compared against the threshold as stored. If the value(s) are within acceptable limits, then the user is prompted at step 608 that the system can be enabled. If one or more of the values are not within acceptable limits (e.g., there are too many panels, and/or the total rated wattage is above system capacity), then the system is disabled at step 612 and the user is prompted of the nature of the problem at step 614. Additional checks may also be occurring for system abnormalities, e.g., grounding fault, over-voltage, over-current, etc.

Steps 606 and 608 continue in a loop until the user activates the system at 610; this gives the user the opportunity to add more panels while the system monitors changes to confirm that the installation remains within system parameters. Once the user engages the system at 610 (which in FIG. 6 only occurs if the system is not exceeding some value at 606), normal system operation engages at step 611.

During normal system operation, controller 502 continues to monitor the status of the data sources 302 for changes in the connected panels 102, and potentially other system abnormalities. If a configuration change occurs that exceeds system parameter(s) at step 616, then controller 502 disables or governors the system at step 612 as discussed above.

Optionally, the system can as a fallback at step 618 determine whether the total output of the array of panels 102 exceeds a safety level; this safety level could be the same threshold as used for the total rated wattage, or some other value. If such an excess is detected, controller 502 disables or governors the system at 612. In the alternative, control 502 can communicate with the adaptors 104 to shut down individual panels.

Figure 7:
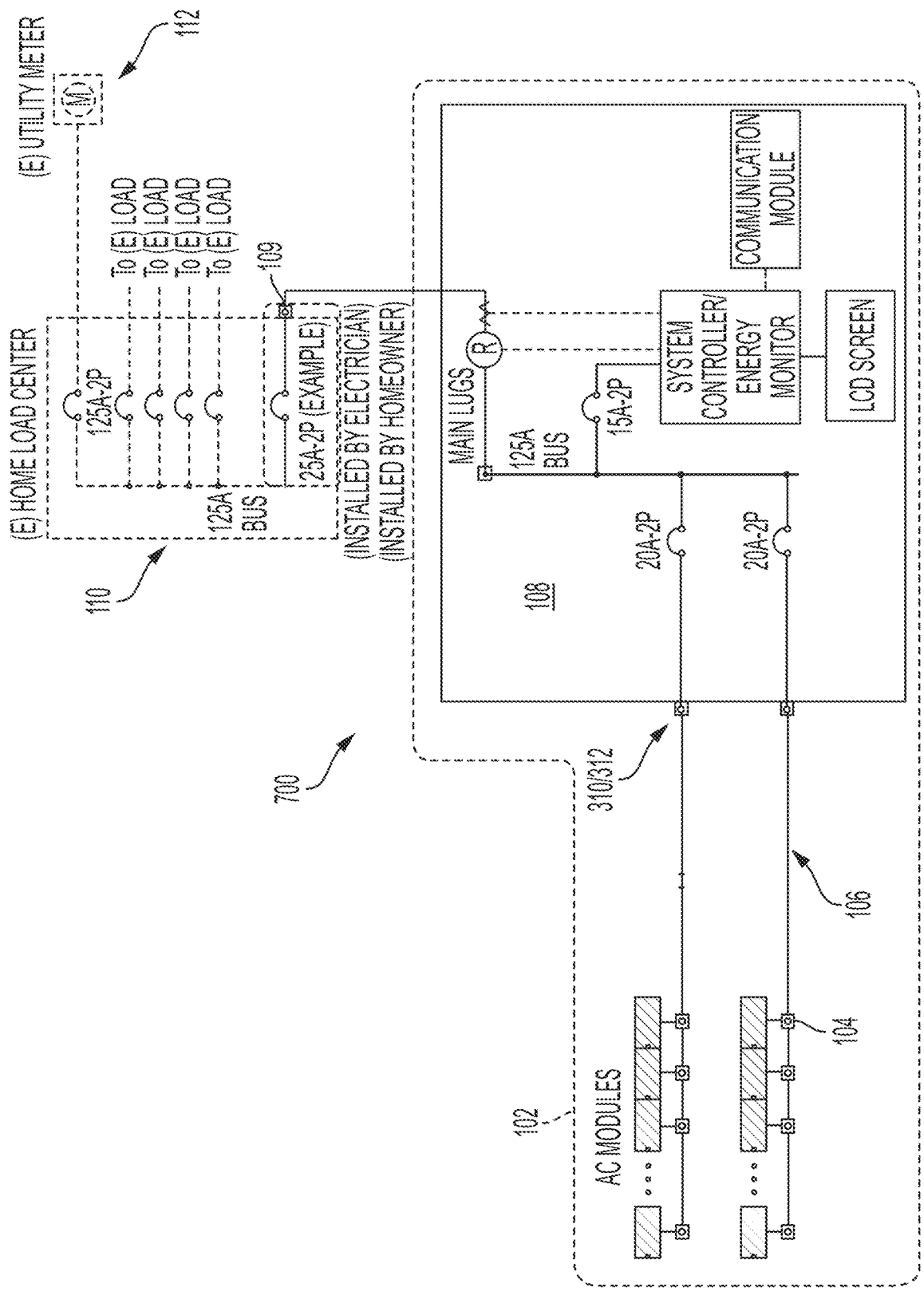
FIG. 7 illustrates a more detailed end-to-end embodiment of the invention.

Referring now to FIG. 7, a more detailed schematic of a system 700 according to an embodiment of the invention is shown.

As noted above, it is possible that overages can occur despite the above safety measures. One such reason is simple mechanical failure. Another such reason would be if the user defies the instructions and connects multiple panels 102 in series or parallel through connections other than adaptor 104, referred to herein as a "cluster" of panels. Yet another would be if a user damaged the system by cutting and splicing wires together. In such a case the information from data store 302, which is specific to a particular panel, would not accurately represent the number of panels or the output characteristics of the cluster.

There are a variety of methodologies to prevent the formation of clusters. One such methodology is to exclude connectors on panels 102 other than adaptor 104 bearing specific connectors 304. Another methodology for when other connections are present is to physically or electrically disable such other connections when adaptor 104 is used. For example, insertion of connector 306 into 304 physically flips a switch that disconnects other connectors. By way of another example, adaptor 104 includes a cap that may be inserted into other connectors inherent to panel 102.

Figure 8:
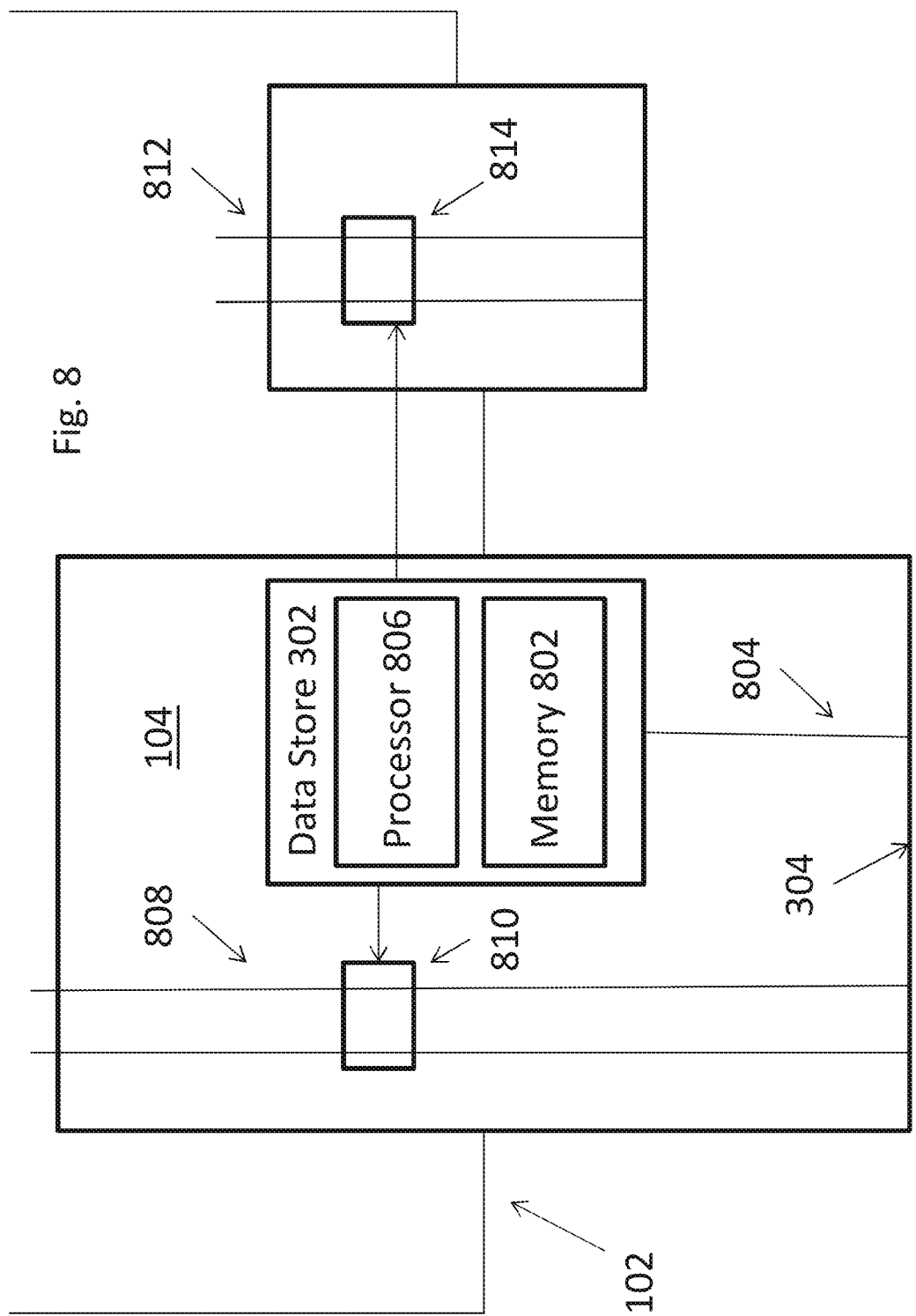
FIG. 8 illustrates a data store and accompanying components according to an embodiment of the invention.

Referring now to FIG. 8, a schematic of an embodiment of data store 302 on adaptor 104 relative to panel 102 is shown. At a minimum, data store preferably includes a memory 802 with the information about panel 102. Memory 802 can communicate with cable 106 via a signal pathway 804 that terminates in connector 304.

If "smart" functions are desired, a processor 806 may also be provided. One optional smart function is for processor 806 to control power output from panel 102 via switch 810 on power lines 808. Another optional smart function is for processor 806 to control other power connections 812 via a switch 814. As noted above, data store 302 can, either on its own control or under instruction from smart station 108, enable and disable the various power conduits to prevent daisy chaining and/or to isolate potential problem areas.

Figure 9:
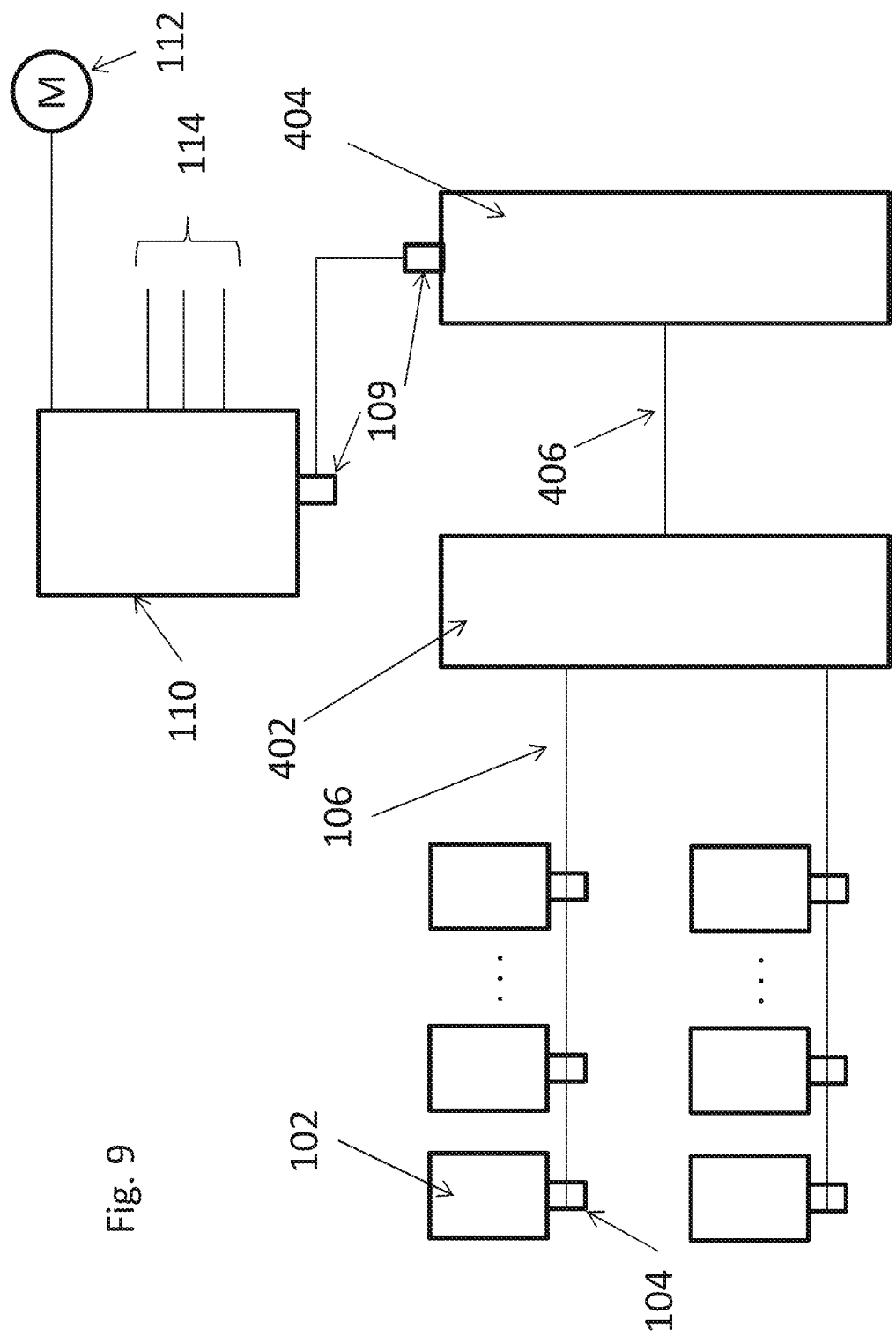
FIG. 9 illustrates another embodiment of the invention.

According to another embodiment of the invention, the functionality of smart station 108 can be separated into distinct components, which may have distinct or overlapping functionality. By way of non-limiting example, FIG. 9 shows smart combiner 402 that connects to a station 404. Smart combiner 402 may be mounted on the roof or otherwise in close proximity of the panels 102; the racking (not shown) for the array of solar panels 102 may be an appropriate attachment structure. The closer proximity allows for shorter cables 106, as cables 106 do not need to run the full length to the station 404. A single cable/connection 406 can then connect smart combiner 402 and smart station 404.

The cable 106 will feed into the smart combiner 402 via connectors 312 consistent with the description of FIG. 1. Smart combiner 402 may have components similar to those discussed with respect to FIG. 5 to monitor and react to system parameters. This will give the user real-time feedback (such as LED lights) regarding connections about how many panels 102 can be safely connected as the user is connecting panels on the roof. The smart combiner box may also ground the panels and racking system by biting into the racking. In this embodiment, other functions of the smart station 108 of FIG. 1—including shutting off the power or reducing power produced by the solar panels, cutting off the flow of power into the home's electrical system, recognizing ground faults, over-voltage, and over-current situations, etc.—would be part of station 404. Smart combiner 402 and station 404 could be connected by custom end cables in the manner discussed herein, or more conventional electrical wiring. Smart combiner 402 could serve a grounding function by clipping directly on to the racking for the panels. The smart combiner 402 could ground the racking by running a grounding wire back through the cable from the smart connector to the smart station 108.

The various system monitoring and diagnostics of the embodiment of FIG. 9 preferably run according to the same flowchart as shown in FIG. 6. However, the functionality of controller 502 in the decision making can be implemented in smart combiner 402 and/or station 404. If both combiner 402 and station 404 have controllers, the two may consult with each other (which may be as simple as exchanging data) to determine whether the system is operating within safe parameters and/or whether act needs to be taken.

Solar panels 102 preferably include a DC/AC inverter to output AC power, such as AC solar panels, sometimes referred to as AC modules. An AC module is defined in relevant part by NEC 690.2 as "a complete, environmentally protected unit consistent of solar cells, optimizers, inverters, and other components . . . designed to generate ac power when exposed to sunlight." When used in conjunction with AC modules, cables 106 would be at least partially AC power cables. A charge converter and/or batteries (not shown) could also be provided.

The distribution of components and functionality in connection herein is not limited to FIG. 9; so long as the desired functionality (which may include some, all, and/or additional functionality that discussed herein) is implemented, the physical placements of the components may not be relevant. Other distributions, or combinations of distributions are thus possible. Controllers and processors may thus be individual components located in particular components, or distributed in multiple components that cooperate to execute the functionality discussed herein.

Figure 10:
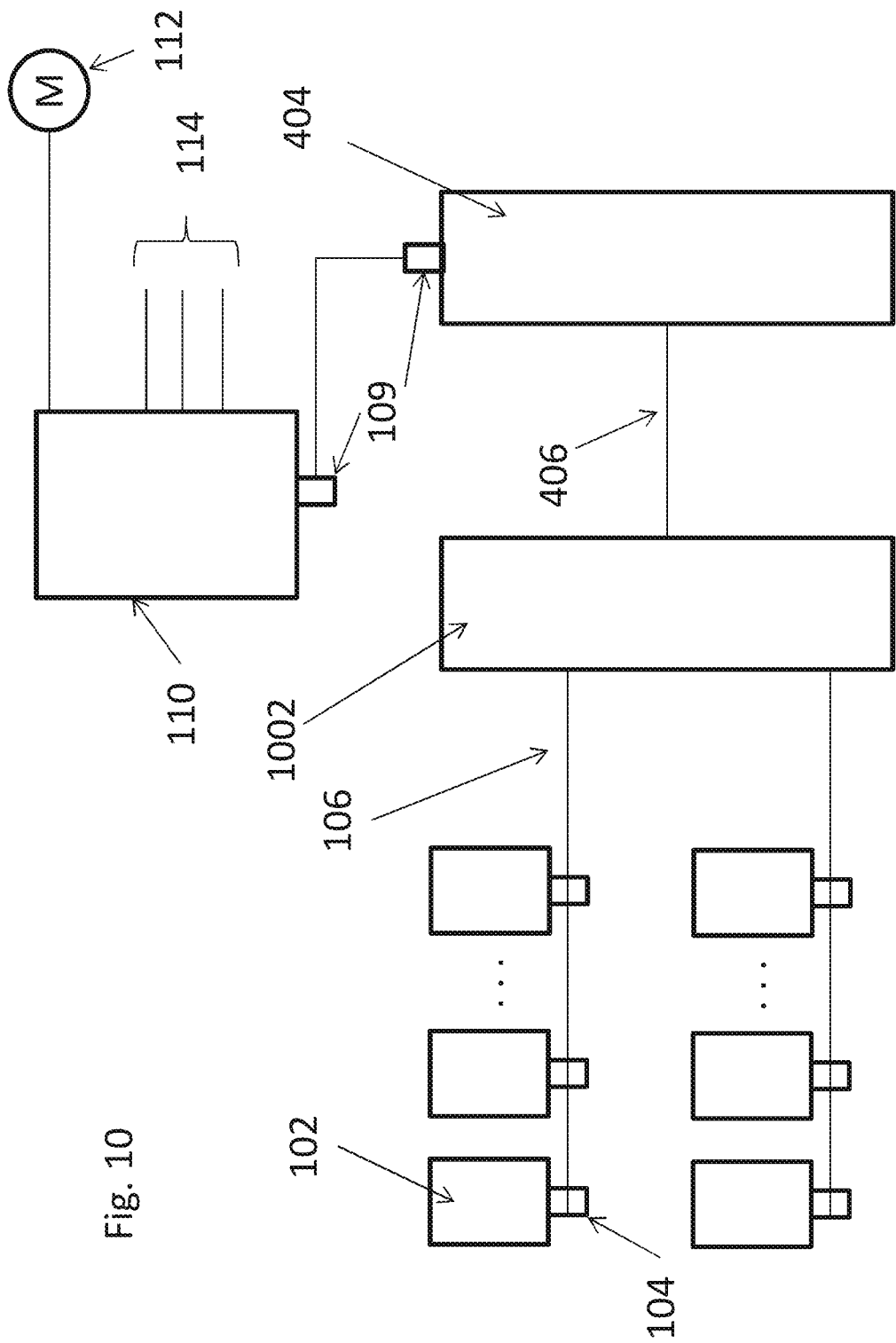
FIG. 10 illustrates another embodiment of the invention.

By way non-limiting example, FIG. 10 shows an embodiment in which the functionality of smart combiner 402 and/or station 404 is incorporated into a DC/AC inverter 1002 that connects to one or more panels 102. To the extent not already present in a conventional DC/AC inverter, inverter 1002 would include the necessary hardware and/or software to effectuate the functionality as consistent with smart combiner 402 and/or station 404 above. Cable connections between components preferably retain their unique characteristics as discussed herein.

Figure 11:
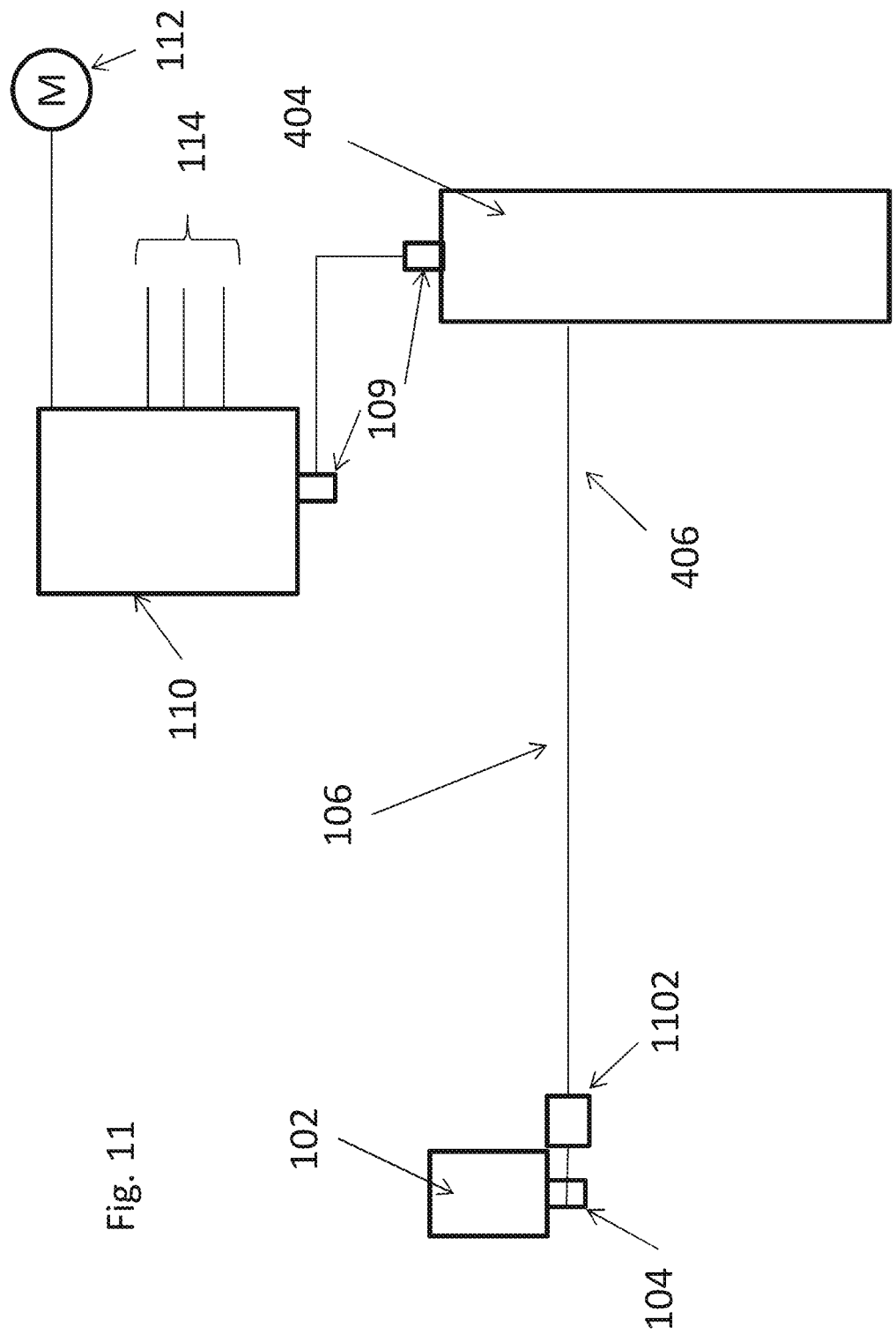
FIG. 11 illustrates another embodiment of the invention.

By way of another non-limiting example, so-called "micro-inverters"—which provide DC/AC conversion on a panel-per-panel basis—can also be used to provide the functionality as discussed herein. FIG. 11 shows an embodiment in which the functionality of smart combiner 402 and/or station 404 is incorporated into a micro DC/AC inverter 1102 that connects to (or is incorporated into) one or more panels 102. (Only one such panel/inverter combination is shown in FIG. 11, although it is to be understood any number of panel/inventor combinations could be present.) To the extent not already present in a conventional micro DC/AC inverter, inverter 1102 would include the necessary hardware and/or software to effectuate the functionality as consistent with smart combiner 402 and/or station 404 above. Cable connections between components preferably retain their unique characteristics as discussed herein.

By way of another non-limiting example, the functionality smart combiner 402 and/or station 404 can be incorporated into data store 302 as discussed with respect to FIG. 8.

The various connectors herein are described as single/unitary connectors. However, this need not be the case, and the connectors could have multiple branches, e.g., one or more branches for power transmission, one or more branches for grounding purposes, and/or one or more branches for information transmission. Each branch may itself be made of one or more wires.

As discussed above, it may be valuable for the system to be able to count the number of solar panels 102 connected to smart station 108. Herein follows embodiments of methodologies by which the count may be obtained for AC modules. Panels 102 as discussed herein may be considered AC modules (see, e.g., FIG. 7), but this need not be the case.

Figure 12:
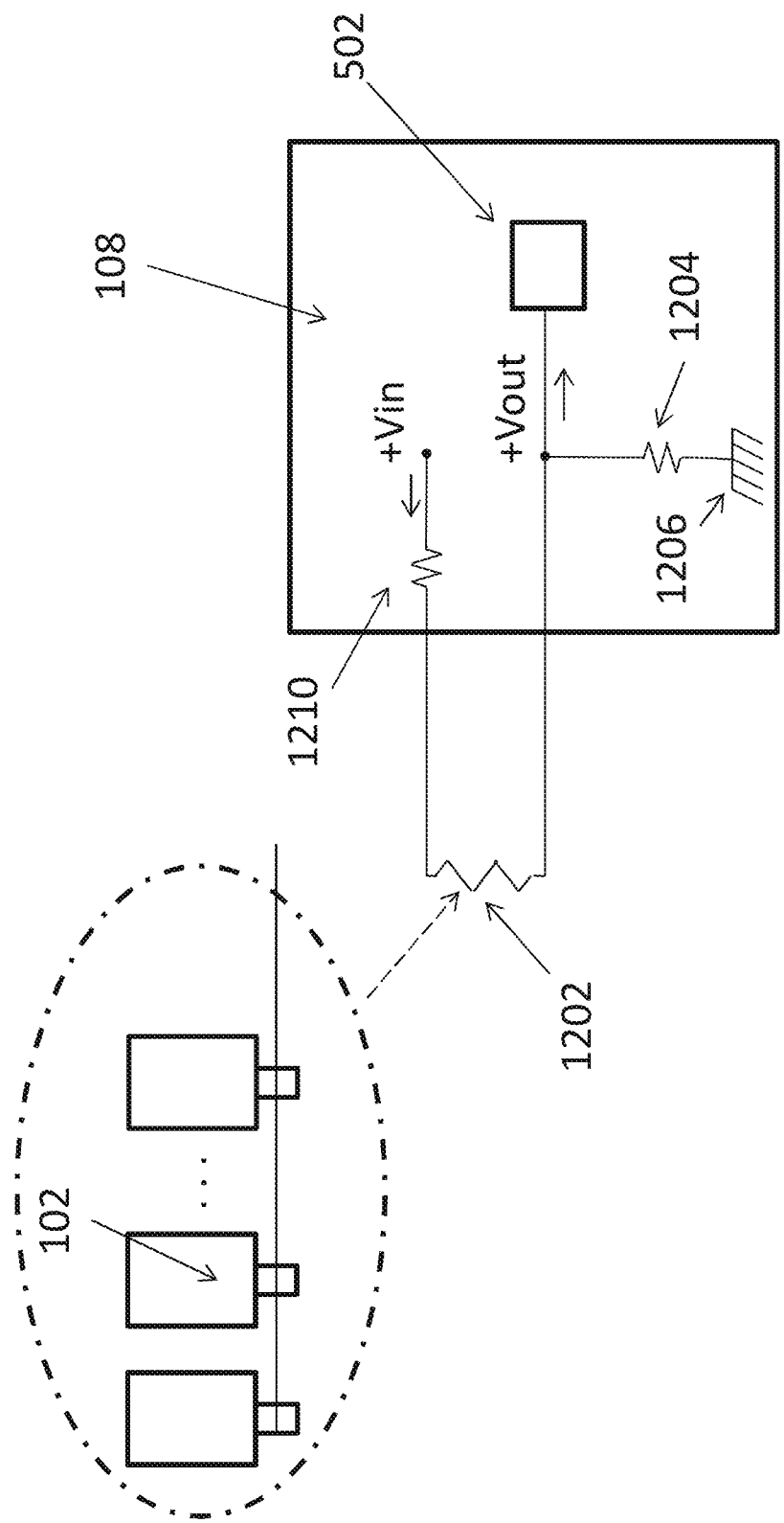
FIG. 12 is a conceptual drawing of an equivalent circuit created by components of an embodiment of the invention to facilitate counting the number of panels.

One embodiment of a counting methodology is to utilize resistors in conjunction with each panel 102 and smart station 108. Referring now to FIG. 12, the layout will define a circuit with an internal resistance 1204 within the smart station 108 and an external resistance 1202 created by the network of solar panels 102 and related components. An optional additional resistance 1210 may also be provided internally or externally to balance the overall performance, but for ease of discussion in the embodiments herein the resistance is not present (zero) unless otherwise specified.

Resistances 1202 and 1206 (along with 1210 if present) act as a voltage divider, such that an applied voltage +Vin will result in a reduce voltage +Vout. Since the number of panels 102 at least in part determines the external resistance 1202, the voltage output +Vout will be different based on the number of panels 102. Smart station 108 applies an algorithm or applies a data table to convert the +Vout into a corresponding number of panels 102, thereby counting the number of panels.

By way of general example for explanation purposes only, presume resistance 1204 is 100 ohms, and the collective resistance 1202 from three (3) solar panels connected to smart station 108 is 100 ohms. If +Vin is 5 volts, then +Vout is 2.5 volts, assuming resistor 1210 has a resistance of 0 ohms. Smart station 108 determines by either formula or consultation of a data table that 2.5 volts corresponds to a voltage that would be expected for three connected solar panels 102 connection. Smart station 108 thus determines that three panels are present because it received 2.5 volts as +Vout, as opposed to some other number.

By way of comparison example, presume resistor 1204 is 100 ohms, and the collective resistance 1202 from nine (9) solar panels connected to smart station 108 is 300 ohms. If +Vin is 5 volts, then +Vout is 1.25 volts. Smart station 108 determines by either formula or consultation of a data table that 1.25 volts corresponds to a voltage that would be expected for nine connected solar panels 102. Smart station 108 thus determines that nine panels are connected because it received 1.25 volts as +Vout, as opposed to some other number.

Practical implementation of the above methodologies relates to establishing a paradigm and supporting architecture by which collective resistance 1202 is unique to the environment of solar panels 102. By way of example, collective resistance 1202 should be sufficiently different for 3 connected solar panels relative to 4 connected solar panels such that smart station 108 can distinguish the corresponding +Vout outside of a range of tolerance. Specifically, resistors and electrical components have various tolerances, and the determination methodology of smart station 108 allows for variance. Thus, +Vout does not need to meet an exact value, but rather a value within a range of tolerance common to such components. (All discussion of meeting certain values as herein descried or claimed is to be understood to allow for such variation, regardless of whether it is expressly stated). Ultimately, the +Vout for any particular connected number of panels and related components is sufficiently unique and outside the range of tolerance of a different environment that it can be recognized by smart station 108.

Currently, there are two predominant types of connections for panels 102: daisy chain strings and trunk branch. Each may raise different considerations in the implementation of the counting methodology. Preferably, these considerations are addressed via the cabling that connects industry standard solar panels; however, the invention is not so limited and the architecture can be based on custom panels and/or cables.

A daisy chain string often involves a parallel connection of the power pathway for voltage generated by individual panels. Referring now to FIGS. 13A-C, a first common type of AC solar panel 1300 (which may be panel 102 in the prior embodiments) is configured as daisy chain string, in which panels 1300 are connected in series by cables 1312. Such panels 1300 may have a micro inverter 1302 with two power/data pathways 1306/1308 and two end connectors 1308/1310. Panel 1300 includes capacitors and/or capacitive elements generically shown at 1350.

Cables 1312 with end connectors 1316 and 1318 connect smart station 108 to the most upstream panel 1300 in the series, and each subsequent pair of panels 1300. An end cap 1314 closes off the last connector 1308 of the most downstream panel in the daisy chain string. With all components properly connected an electrical path collectively runs from smart station 108 through all panels 1300 to end cap 1314.

Figure 14:
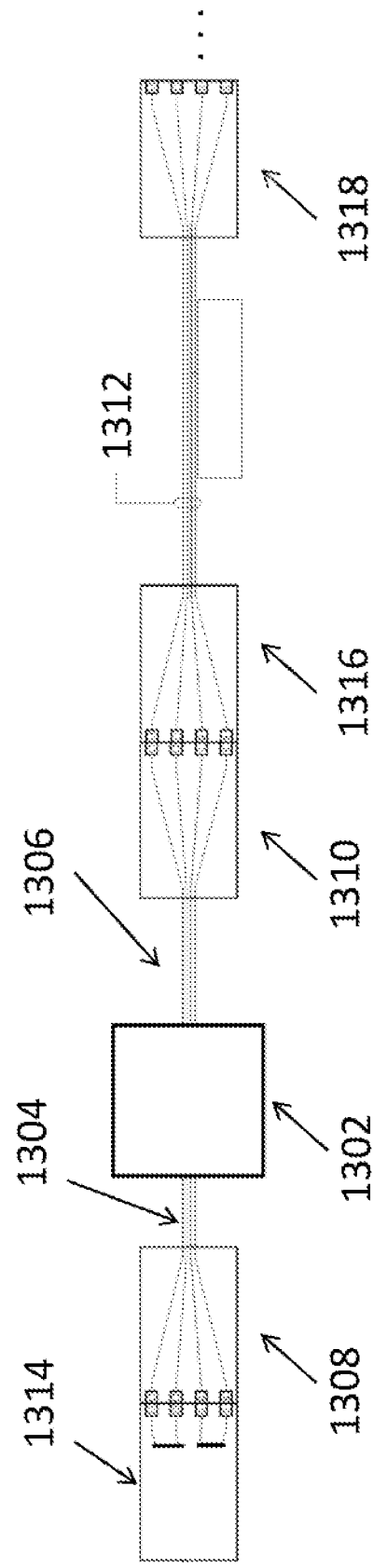
FIG. 14 shows an embodiment of internal connections for the embodiment of FIGS. 13A-C.

Cable 1312 includes at least 4 pathways, which are preferably conductors. Pathways 1320 (L1) and 1322 (L2) collectively form the overall pathway for power generated by the solar panels 102 to transmit to the smart station 108 for ultimate transmission to the home load center 110. Pathway 1324 (S) is a signal pathway and preferably carries a low voltage signal (e.g., 5 volts or less). Pathway 1326 (G) is a return pathway that may combine with pathway 1324 to form a circuit to apply a signal in the form of an applied voltage. Return pathway 1326 can also discharge current from a ground fault, although a separate pathway may be provided for that purpose. End connectors 1316 and 1318 connect the cable 1312 to other cables and input/outputs as appropriate. FIG. 14 shows a panel 1300 connected upstream to a cable 1312 and downstream to an end cap 1314.

Figure 13:
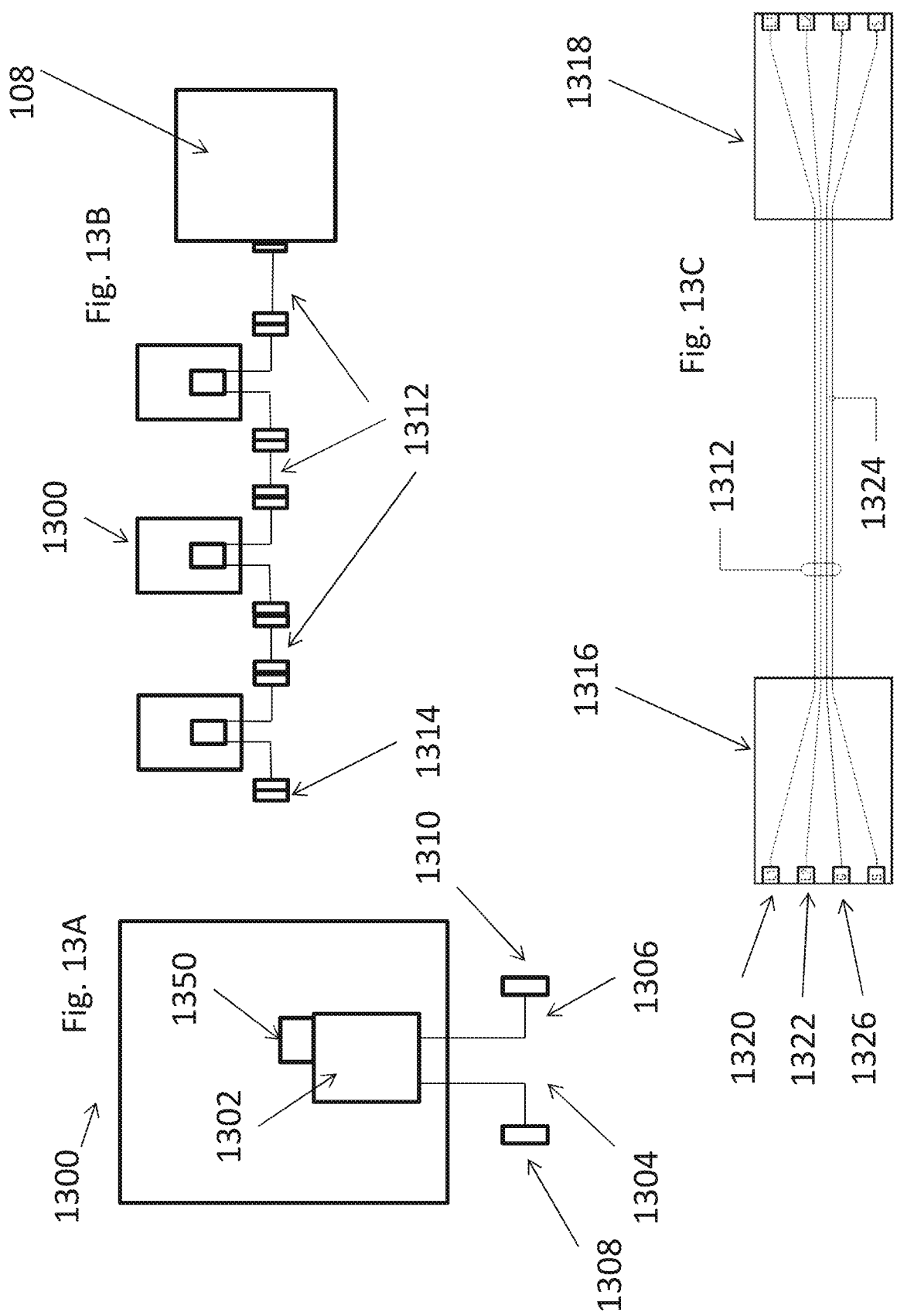
FIGS. 13A-C show an embodiment of a solar panel with associated cabling for a series connection.
Figure 15:
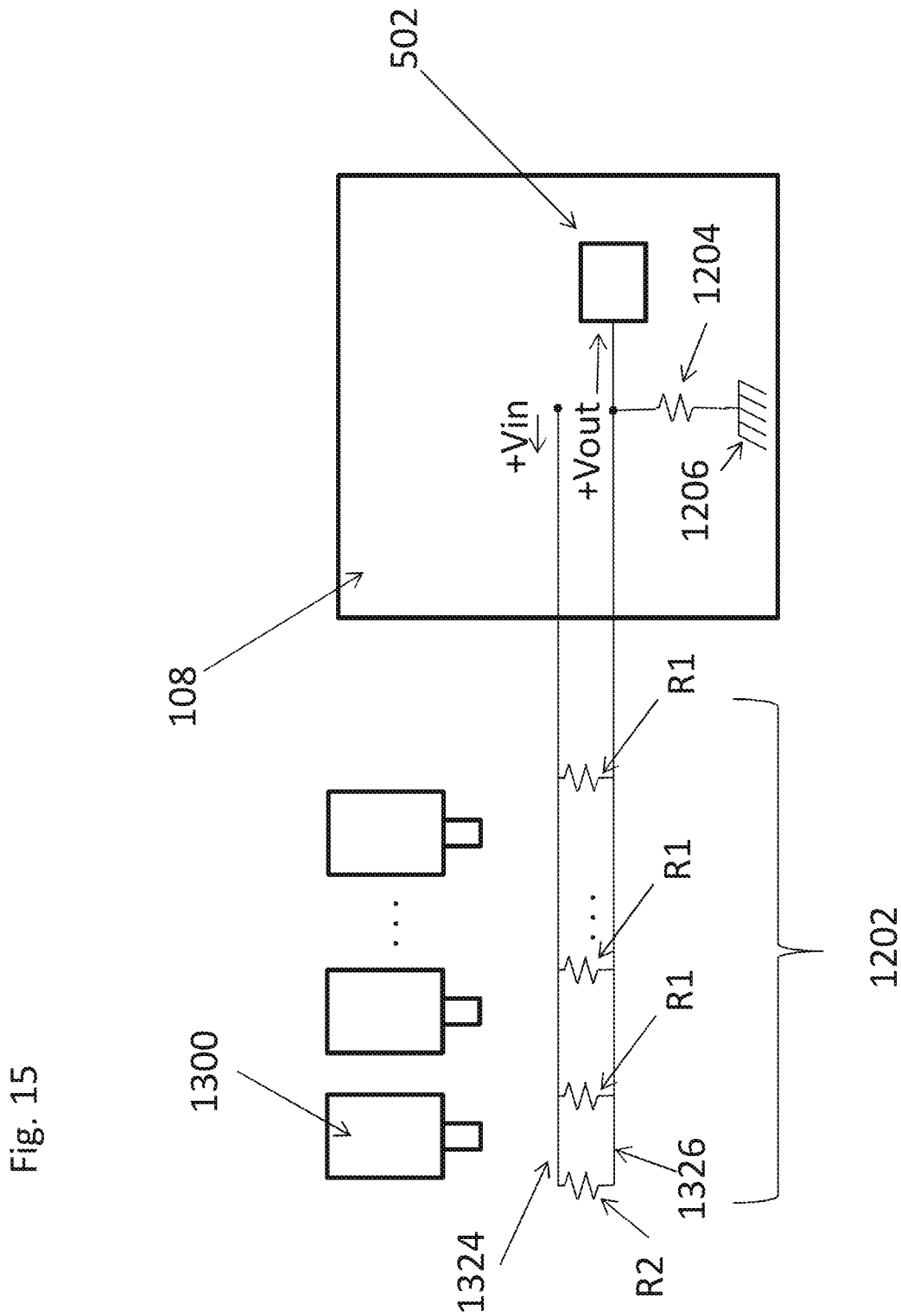
FIG. 15 is a conceptual drawing of an equivalent circuit created by components of an embodiment of the invention to facilitate counting the number of panels in a series connection.

FIG. 15 shows the embodiment of FIG. 13 configured to count the number of panels 1300 and/or the presence of end cap 1314 with reference to the corresponding signal pathway 1324 and return pathway 1326. A resistor R1 is provided for each panel 1300 as a parallel circuit element between pathways 1324 and 1326; preferably each resistor R1 is identical, but this need not be the case. A final resistor R2 is provided in parallel with pathways 1324 and 1326 and downstream of the last panel 1300 in the sequence. Resistances R1 and R2 are preferably different, and more particular at least 15 times different. As discussed in more detail below, resistors R1 represent passive elements for each panel 1300, while resistor R2 is part of an end cap of the daisy chain string.

The combination of resistor R2 and as many R1s as may be present form the collective resistance 1202, which can be calculated using standard equations as are known in the art. Based on the number of panels 1300 and corresponding number of resistors R1 present, the voltage divider of smart station 108 will produce a particular output +Vout that smart station 108 can convert into a panel count, such as by comparing the particular +Vout to a data table of expected +Vout values.

The +Vout is thus different based on the number of connected panels 1300. Since these values can be calculated in advance using standard circuit equations, smart station 108 can be pre-loaded with data, such as in a data table, matching various connection scenarios with their corresponding calculated +Vout values; when a produced +Vout value is received by smart station 108, it compared the received +Vout with the stored expected +Vout values in the table to identify the corresponding system setup and number of modules. In this manner smart station 108 counts/determines the number of solar panels 1300 connected in the string. A non-limiting example of a table using the above-noted values (R1=39 k ohms, R2=2 k ohms, resistor 1206=1220 ohms, and +Vin=5.0 v) is as follows:

TABLE 1

| # panels | R w/cap | V w/cap | V min | V max | R w/o cap | V w/o cap |
|---|---|---|---|---|---|---|
| 1 | 3102.439 | 1.933962 | 1.912689 | 1.955236 | 40200 | 0.149254 |
| 2 | 3013.953 | 1.990741 | 1.968843 | 2.012639 | 20700 | 0.289855 |
| 3 | 2933.333 | 2.045455 | 2.022955 | 2.067955 | 14200 | 0.422535 |
| 4 | 2859.574 | 2.098214 | 2.075134 | 2.121295 | 10950 | 0.547945 |
| 5 | 2791.837 | 2.149123 | 2.125482 | 2.172763 | 9000 | 0.666667 |
| 6 | 2729.412 | 2.198276 | 2.174095 | 2.222457 | 7700 | 0.779221 |
| 7 | 2671.698 | 2.245763 | 2.221059 | 2.270466 | 6771.429 | 0.886076 |
| 8 | 2618.182 | 2.291667 | 2.266458 | 2.316875 | 6075 | 0.987654 |
| 9 | 2568.421 | 2.336066 | 2.310369 | 2.361762 | 5533.333 | 1.084337 |
| 10 | 2522.034 | 2.379032 | 2.352863 | 2.405202 | 5100 | 1.176471 |
| 11 | 2478.689 | 2.420635 | 2.394008 | 2.447262 | 4745.455 | 1.264368 |
| 12 | 2438.095 | 2.460938 | 2.433867 | 2.488008 | 4450 | 1.348315 |
| 13 | 2400 | 2.5 | 2.4725 | 2.5275 | 4200 | 1.428571 |
| 14 | 2364.179 | 2.537879 | 2.509962 | 2.565795 | 3985.714 | 1.505376 |
| 15 | 2330.435 | 2.574627 | 2.546306 | 2.602948 | 3800 | 1.578947 |
| 16 | 2298.592 | 2.610294 | 2.581581 | 2.639007 | 3637.5 | 1.649485 |
| 17 | 2268.493 | 2.644928 | 2.615833 | 2.674022 | 3494.118 | 1.717172 |
| 18 | 2240 | 2.678571 | 2.649107 | 2.708036 | 3366.667 | 1.782178 |
| 19 | 2212.987 | 2.711268 | 2.681444 | 2.741092 | 3252.632 | 1.84466 |
| 20 | 2187.342 | 2.743056 | 2.712882 | 2.773229 | 3150 | 1.904762 |

The first column of Table 1 represents the number of panels 1300, and each row reflects data for that particular panel 1300. The second column "R w/cap" represents the expected collective resistance 1202 in ohms for the particular number of panels 1300 in combination with a properly installed end cap 1314. The third column "V w/cap" represents the expected +Vout voltage for the particular number of panels 1410 in combination with a properly installed end cap 1314.

By way of non-limiting example, R1 can be 39 k ohms, R2 can be 2 k ohms, resistor 1206 can be 1220 ohms, and +Vin can be 5.0 v. If only one panel 1300 is present, the +Vout is expected to be 1.933962 volts. If two panels 1300 are present, then +Vout is expected to be 1.990741 volts. If five panels 1300 are present, then +Vout is expected to be 2.149123 volts.

In practice, resistors and other circuit elements are not exact values, but rather have a tolerance and corresponding range of error. A tolerance of ±1% is a typical tolerance for resistors and is appropriate for use with at least some embodiments herein, although the invention is not limited to the same. Due to the tolerance, the +Vout of the system would not exactly match the voltages listed in the second column of Table 1. Rather, the +Vout would be expected to fall within some range around those values. This range may be expressed by way of non-limiting examples as ±value off the expected +Vout (e.g., ±1%). In another non-limiting example, the range can be specifically defined by calculating the expected minimum and maximum voltages +Vout due to the most extreme state of tolerance (e.g., all resistors at +1% of tolerance v. all resistors at −1% of tolerance), such as shown in the fourth and fifth columns of the table. Smart station 108 thus compares the received +Vout from the voltage divider to the noted ranges to identify the corresponding number of panels. In this context, all discussion of match in +Vout as discussed herein includes allowance for this range of tolerance in both the specification and claims, regardless of whether expressly stated.

By way of non-limiting example, if the received +Vout is 2 volts, then per Table 1 smart station 108 would determine that two (2) panels are connected with properly installed end cap 1314 because 2 volts falls within the Vmin and Vmax for a two panel configuration with a properly installed end cap 1314.

Figure 16A:
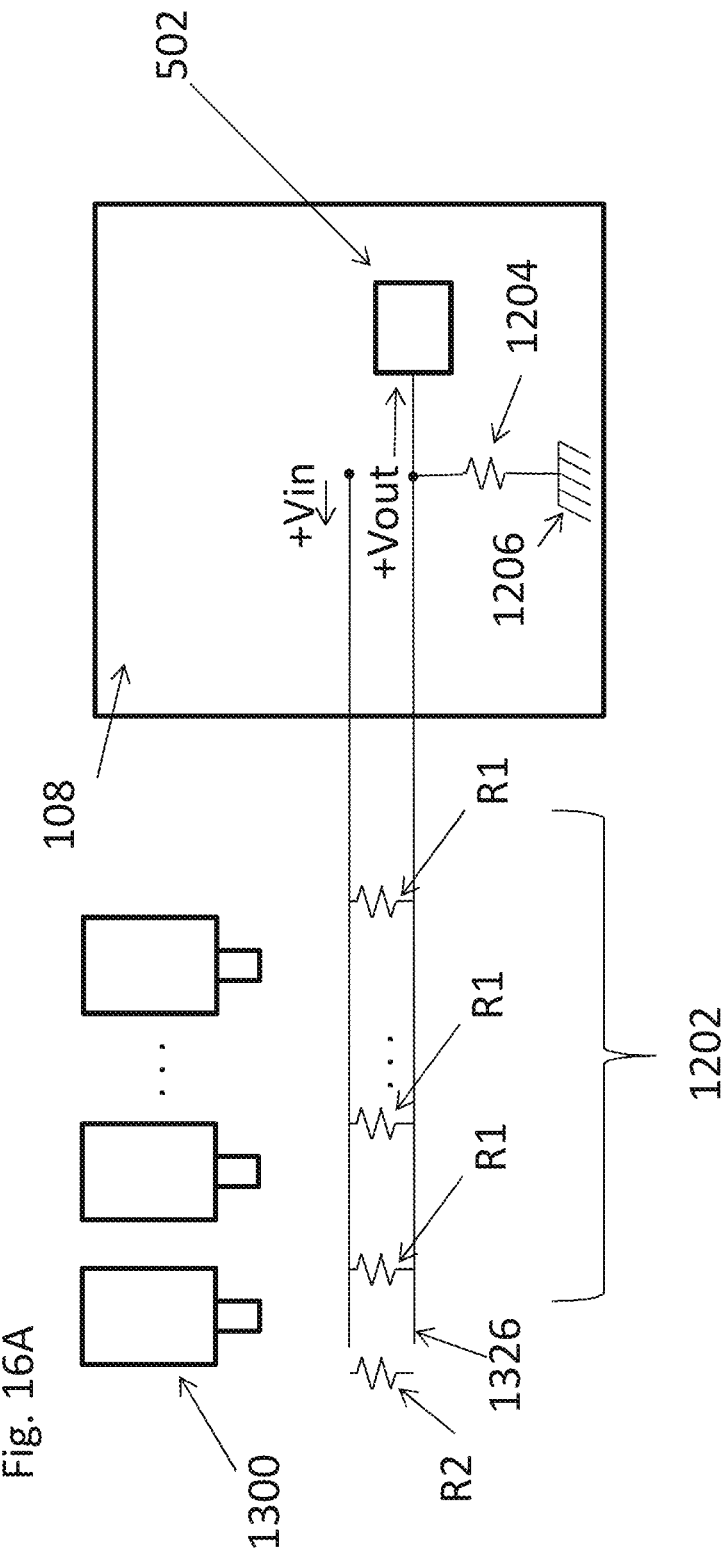
FIGS. 16A and 16B illustrate the embodiment of FIG. 15 with a missing end cap.
Figure 16B:
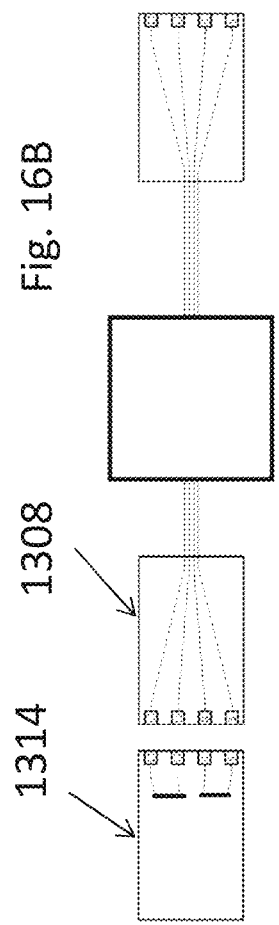

As discussed above, end cap 1314 closes off an electrical connection at the far end of the daisy chain string; failure to include and properly install the end cap may present a failure/safety hazard due to water entering the electrical system. By incorporating resistor R2 into end cap 1314, the system can detect the proper/improper installation of end cap 1314. Specifically, the values of the second-fifth columns are based on a properly connected end cap 1314 and the corresponding expected collective resistance 1202 and voltage +Vout. However, referring now to FIGS. 16A and B, if the end cap 1314 is not connected, then resistor R2 is not connected, resulting in a different collective resistance 1202 defined only by the parallel connections of the resistors R1. As this condition can be pre-calculated it may be line item in the data table to identify a missing end cap 1314, and such values are reflected in the sixth and seventh columns of Table 1.

By way of non-limiting example, using the numbers above, a single panel 1300 with an end cap 1314 would result in an expected +Vout of 1.933962, but a single panel 1300 with a missing end cap 1314 would result in a +Vout of approximately 0.149254. In the alternative, there may be no corresponding voltage in the data table, in which case the system could simply respond through the interface with an error indicator. In either case, smart station 108 would disable the flow of power from the panels 1300 until the error was corrected (which it would determine by a subsequent counting effort in which an appropriate +Vout is received).

The various resistor and voltage values that support and are set forth in Table 1 are exemplary only, and other combinations may be used. The combination selected may have certain features. One such feature is that the range of expected voltages for any one circumstance should not overlap with the range for a different circumstance. For example, in Table 1 above, for one panel the Vmin/max is approximately 1.912-1.955 volts, while for two panels the Vmin/max is approximately 1.969-2.012 volts. Due to the lack of overlap, no +Vout would be received which could be attributed to different numbers of panels.

A second feature of the resistor combination is that the resistor values of R1 and R2 are so different that the entire range of voltages for panels 1300 with end caps 1314 does not overlap with the entire range of voltages for panels 1300 without end caps 1314. In the example of Table 1, the entire range of voltages for panels 1300 with end caps 1314 is approximately 1.912 volts (1 panel, Vmin) to 2.712 volts (20 panels, Vmax), while the entire voltage range of for panels 1300 without end caps 1314 is 0.149 to 1.904 volts. Due to the lack of overlap, no +Vout would be received with a missing end cap 1314 which could be attributed to a configuration with an end cap present.

Figure 17:
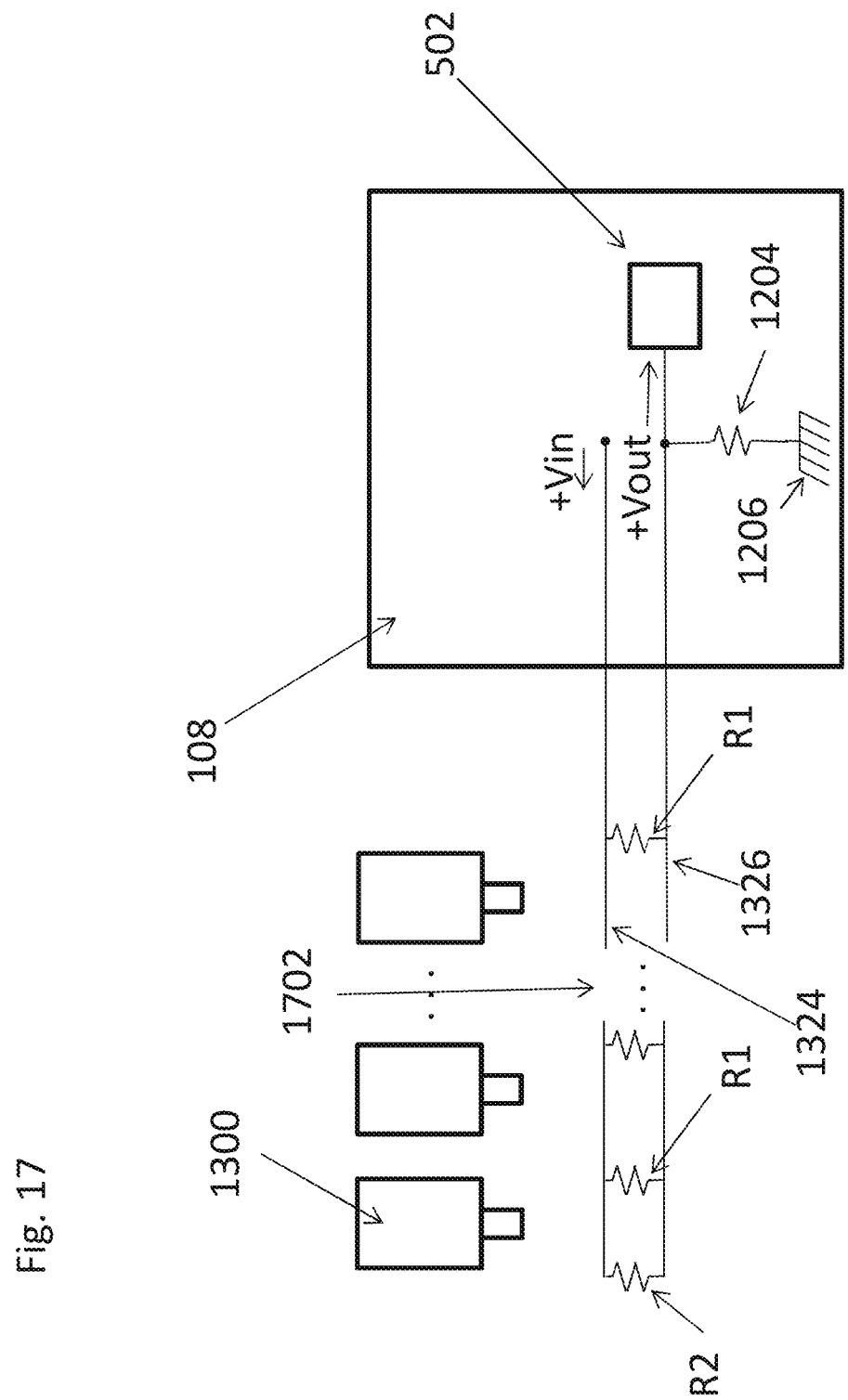
FIG. 17 illustrates the embodiment of FIG. 15 with a break in the electrical pathway.

The same methodology can indicate whether there is a break in the daisy chain string connection such that only some of the panels 1300 are connected. Referring now to FIG. 17, a break in the cable 1312 generates an electrical gap 1702; for purpose of illustration the break is between the first and second panel 1300 closest to the smart station 108, but the break may be anywhere along the pathways. The daisy chain string connection is open circuited by the gap 1702 such that no power can flow from panels 1300 at all. Yet +Vin does flow in the still connected portions of pathways 1324 and 1326, for which the resulting +Vout would be consistent with one (1) connected panel in combination with a missing end cap 1314. The absence of power in combination with a +Vout would allow controller to indicate that there is a break in the electrical path between the first and second panels 1300 in sequence.

FIGS. 18A-C show different embodiments of how resistor R1 may be incorporated into the architecture of a daisy chain string. Resistor R1 can be incorporated into panel 1300, such as by way of non-limiting example incorporated into connector 1310 of panel 1300 in FIG. 18A, and thus provided by the solar panel manufacturer. In FIG. 18B, resistor R1 is incorporated into connector 1316 of cable 1312, and can thus be part of the cable itself as provided by the cable manufacturer. In FIG. 18C, resistor R1 is incorporated into an intermediate connector 1802 that can be inserted between connectors 1310 and 1316.

Figure 19:
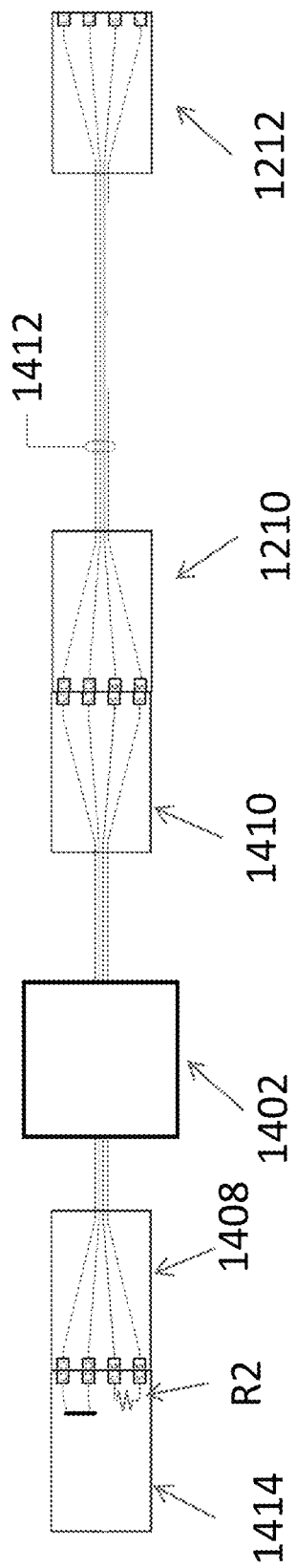
FIG. 19 shows an embodiment of internal connections for the embodiment of FIGS. 13A-C with a resistor for the end cap.

Resistor R2 can be similarly positioned relative to end cap 1314 in the three embodiments of FIG. 18A-18C, i.e., within the panel 1300, the end cap 1314, or an intermediate component. Incorporation into the end cap 1314 is the most preferable as shown in FIG. 19, as the presence or absence of R2 would thus directly correlate to the presence or absence of the end cap 1314 in the electrical pathway.

Figure 20:
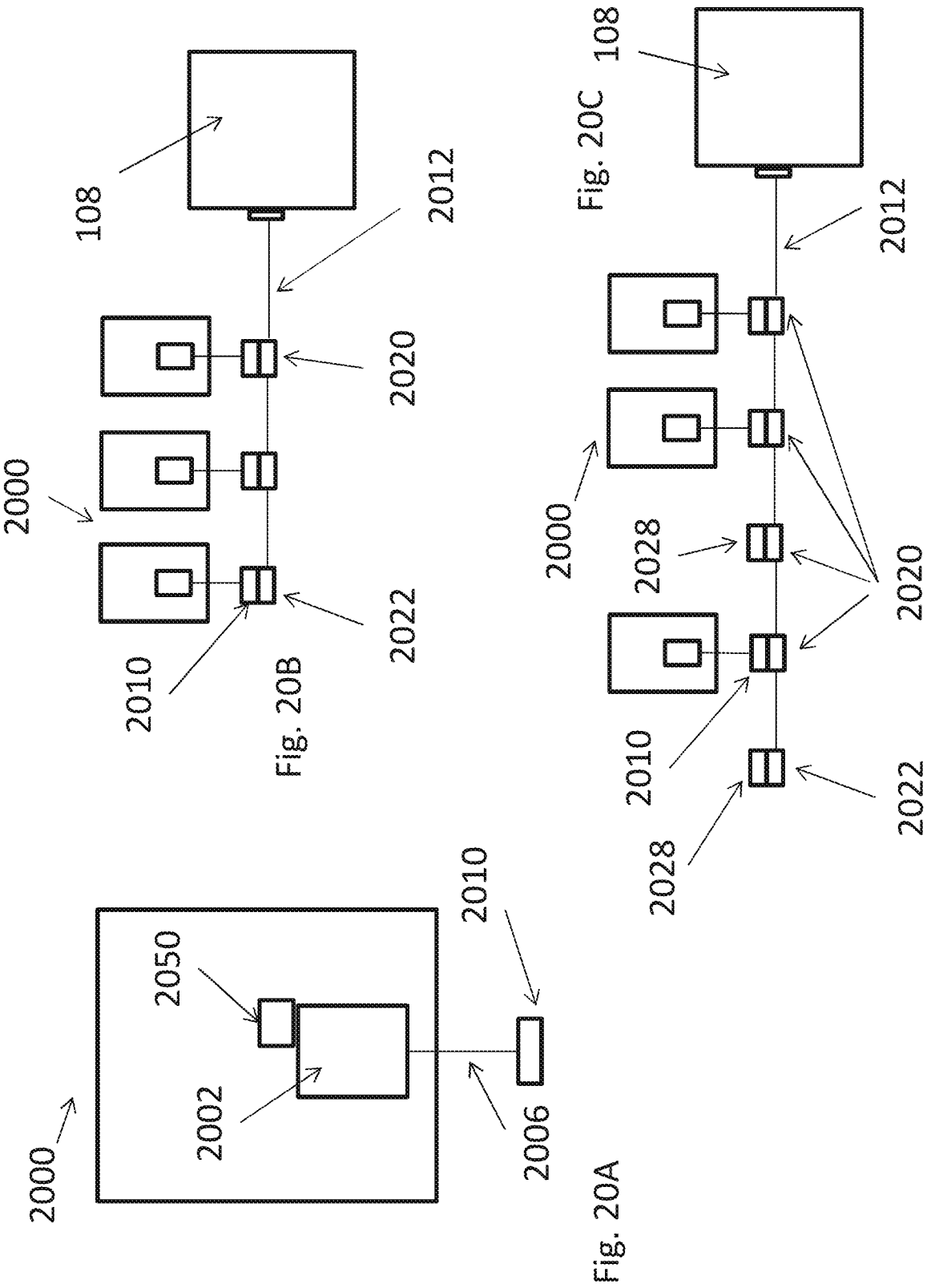
FIGS. 20A-C show an embodiment of a solar panel with associated cabling for a parallel connection.

Referring now to FIGS. 20A-C, a trunk branch configuration is shown for a solar panel 2000. Solar panel 2000 include a micro inverter 2002 connected to a connector 2010 via a cable 2006, as well as capacitors and/or capacitive elements shown generically at 2050. A cable 2012 connects at one end to smart controller 108. Connectors 2020 are placed along the length of cable 2012 with a last connector 2022 at the distal end. As shown in FIG. 20B, the number of connectors 2020/2022 may equal the number of panels 2000, and as such each such connector 2020/2022 connects to a connector 2010 of panel 2000. However, as shown in FIG. 20C, there may be fewer panels 2000 than connectors 2020/2022, in which case each unused connector 2020/2022 has a mounted end cap 2028.

In the series connection, the cabling that defined the electrical pathways comprises a series of individual cable segments that connected each component. The trunk branch connection may be made from a single cable with branch connectors along its length.

Figure 21:
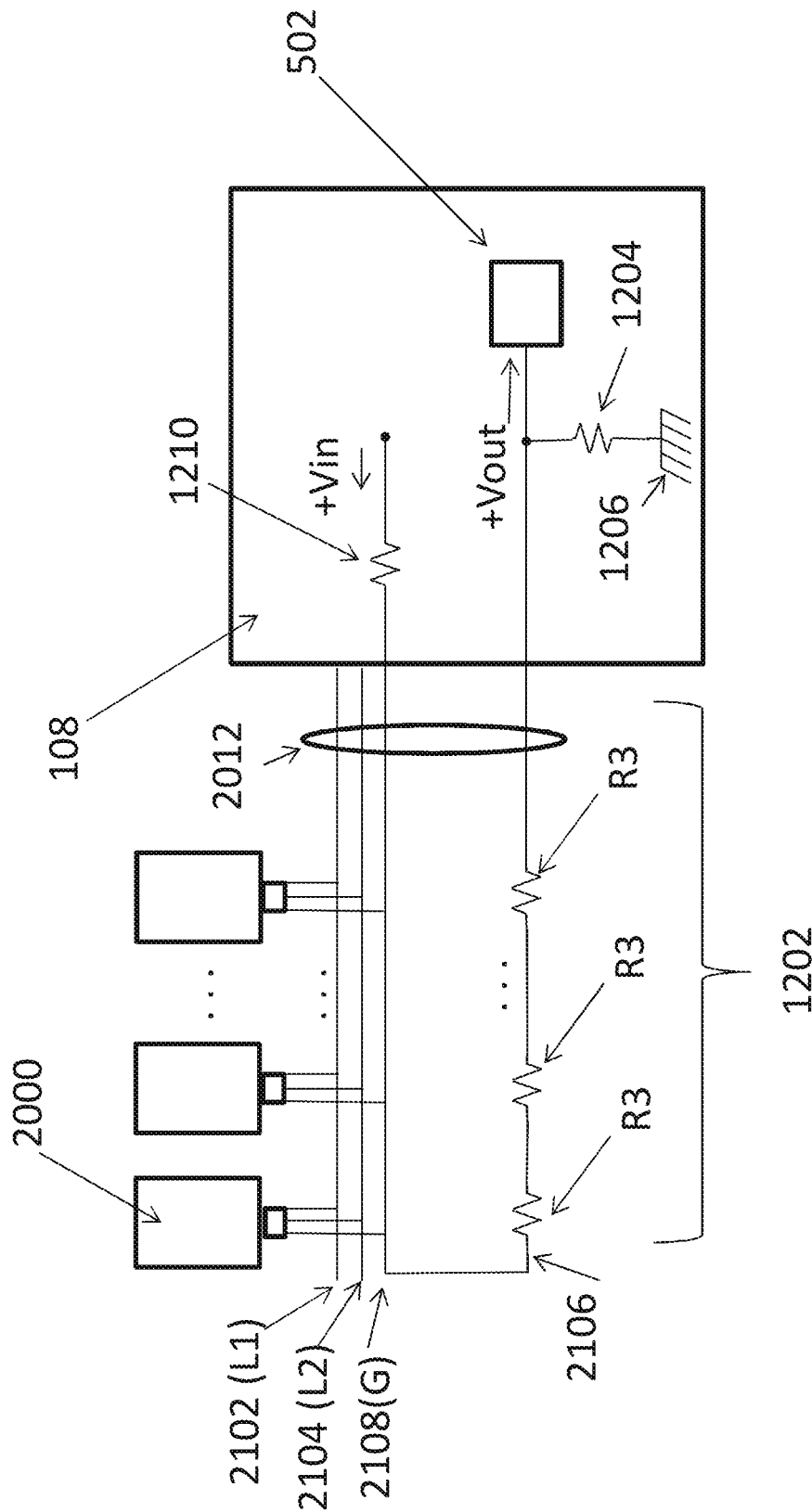
FIG. 21 shows an embodiment of internal connections for the embodiment of FIGS. 20A-C.

Referring now to FIG. 21, cable 2012 preferably includes at least 4 pathways, which are preferably conductors. Pathways 2102 (L1) and 2104 (L2) form the overall pathway for utility power generated by the solar panels 2000 to transmit to the smart station 108 for ultimate transmission to the home load center 110; both pathways 2102 and 2104 are in parallel with the panels 2000 and connected in a known manner not discussed further herein. Pathway 2106 is a signal pathway and preferably carries a low voltage signal (e.g., 5 volts or less). Pathway 2108 (G) is a return pathway that may combine with signal pathway 2106 to form a circuit to apply a low voltage signal (e.g., 5 volts or less). Return pathway 2108 can also act as a pathway to discharge current from a ground fault. A resistor R3 is provided for each panel 2000 as a series circuit element in signal pathway 2106; preferably each resistor R3 is identical, but this need not be the case. Resistors R3 represent passive elements for each panel 2000.

The combination of as many resistors R3 as may be present form the collective resistance 1202, which can be calculated using standard equations as are known in the art. Based on the number of panels 2000 and the corresponding number of resistors R3 present, along with any resistances (e.g., 1204, 1210) or circuit elements the voltage divider will produce a particular output +Vout that smart station 108 can convert into a module count, such as by comparing the particular +Vout to a data table of expected +Vout values.

The +Vout is thus different based on the number of connected panels 1300. Since these values can be calculated in advance using standard circuit equations, smart station 108 can be pre-loaded with data, such as in a data table, matching various connection scenarios with their corresponding calculated +Vout values; when a +Vout value is received by smart station 108, it compared the received +Vout with the stored +Vout values in the table to identify the corresponding system setup and number of modules. In this manner, smart station 108 counts/determines the number of solar panels 102 connected in the string. A non-limiting example of a table using the above-noted values (R3=330 ohms, resistance 1206=100 ohms, resistance 1210=100 ohms and +Vin=5.0 v) is as follows:

TABLE 2

| # panels | V w/no open | V min | V max |
|---|---|---|---|
| 1 | 3.113207547 | 3.144339623 | 3.019811 |
| 2 | 2.619047619 | 2.645238095 | 2.540476 |
| 3 | 2.260273973 | 2.282876712 | 2.192466 |
| 4 | 1.987951807 | 2.007831325 | 1.928313 |
| 5 | 1.774193548 | 1.791935484 | 1.720968 |
| 6 | 1.601941748 | 1.617961165 | 1.553883 |
| 7 | 1.460176991 | 1.474778761 | 1.416372 |
| 8 | 1.341463415 | 1.354878049 | 1.30122 |
| 9 | 1.240601504 | 1.253007519 | 1.203383 |
| 10 | 1.153846154 | 1.165384615 | 1.119231 |
| 11 | 1.078431373 | 1.089215686 | 1.046078 |
| 12 | 1.012269939 | 1.022392638 | 0.981902 |
| 13 | 0.953757225 | 0.963294798 | 0.925145 |
| 14 | 0.901639344 | 0.910655738 | 0.87459 |
| 15 | 0.85492228 | 0.863471503 | 0.829275 |
| 16 | 0.812807882 | 0.820935961 | 0.788424 |
| 17 | 0.774647887 | 0.782394366 | 0.751408 |
| 18 | 0.739910314 | 0.747309417 | 0.717713 |

The first column of Table 2 represents the number of panels 2000, and each row reflects data for that particular panel 2000. The second column V with no open represents the expected +Vout voltage for the particular number of panels 200 in combination with any properly installed end caps 2024. As discussed above with respect to series connections, the +Vout, of the system would not exactly match the voltages listed in the second column due to tolerances, and Vmin and Vmax may be provided to set expected ranges of +Vout shown in the remaining columns (+1% and −3% in Table 2, although the invention is not so limited). Separate columns are not needed to account for end caps, for as discussed below the absence of end cap would generate an open circuit and +Vout would be zero.

The various resistor and voltage values that support and are set forth in Table 2 are exemplary only, and other combinations may be used. The combination selected may have certain features such as those discussed above.

Figure 22:
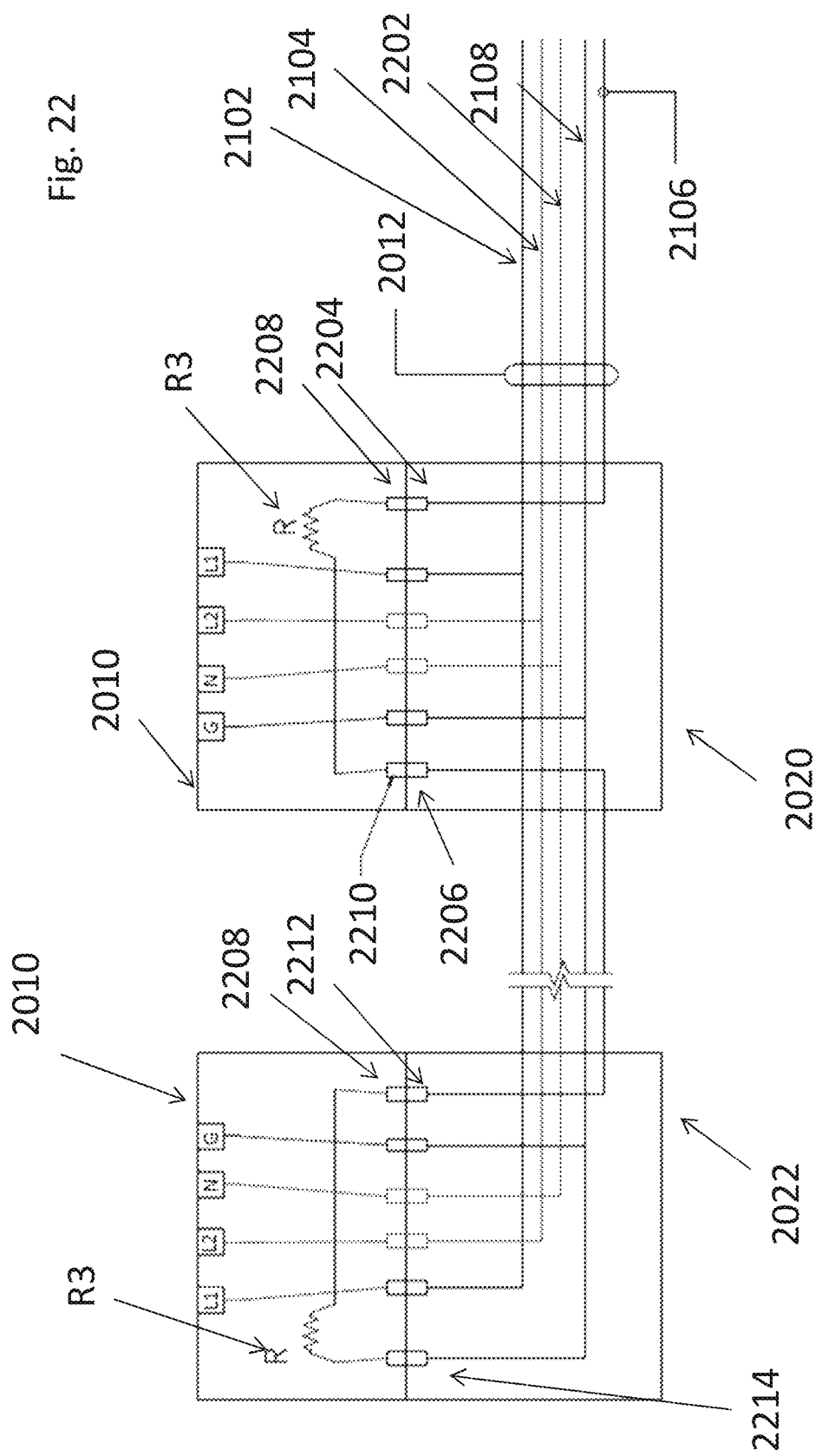
FIG. 22 illustrates an embodiment of resistor placement in the embodiment of FIG. 21.

Referring now to FIG. 22, an embodiment of the internal architecture of the cabling and connectors are shown for the embodiment of FIG. 20B in which each connector 2022/2020 is connected with a corresponding panel 2000. In this embodiment, cable 2012 is a 5 pole cable, including power pathways 2012 and 2104, signal pathway 2106, return pathway 2108, and a neutral pathway 2202 (which is particular to the panel environment and may otherwise not have any specific relevance to counting methodology; and may in fact be omitted entirely). The electrical pathways of power pathways 2012 and 2104, return pathway 2108, and a neutral pathway 2202 extend from beginning to end and connect to connector 2010 of panel 2000 in parallel in a known manner.

The signal pathway 2106 extends in series from smart station 108 to the first connector 2020, ending at a first terminal 2204. Signal pathway 2106 recommences from a second terminal 2206 in connector 2010 and continues downstream along the signal pathway 2106. Within connector 2010, first terminal 2204 and second terminal 2206 preferably do not connect, thereby forming an open circuit.

The connector 2010 of panel 2000 has a first terminal 2208 and a second terminal 2210 that can mate with terminals 2204 and 2206 of connector 2020. Resistor R3 is provided in series between first terminal 2208 and a second terminal 2210. When connectors 2010 and 2020 are connected together, the resistor R3 bridges the terminals 2204 and 2206, thereby closing the circuit pathway and contributing to the collective resistance 1202 as discussed above.

Signal pathway 2106 will from second terminal 2206 downstream along the next segment of cable 2012, terminating at the first terminal 2204 of the next connector 2020. This configuration repeats for all of the connectors 2020, up until the last connector 2022. Cable 2022 has a first terminal 2212 for the signal pathway 2106 similar to first terminal 2204 in connectors 2020. A second terminal 2214 is also provided, but it connects back to the return pathway 2108.

Figure 23:
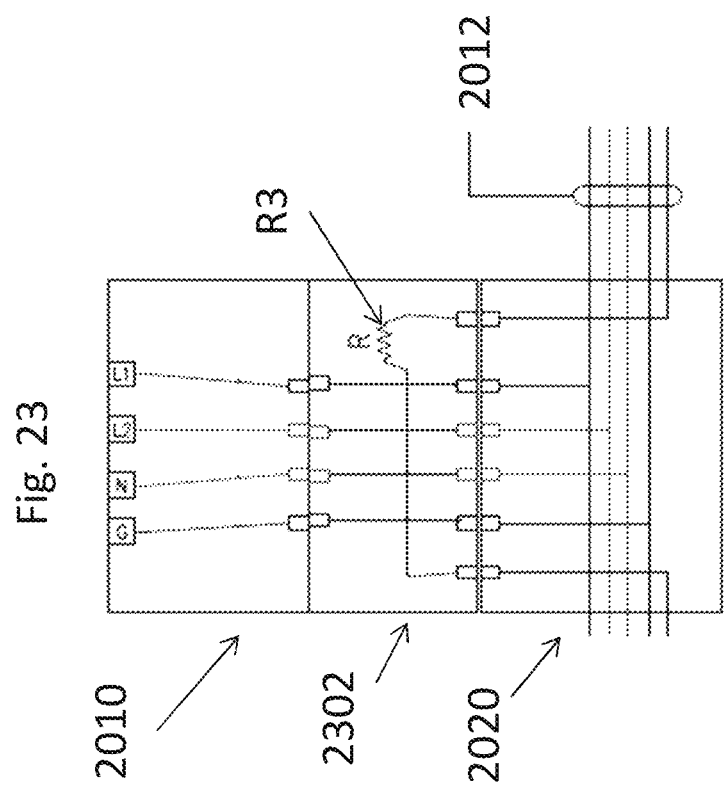
FIG. 23 illustrates the embodiment of resistor placement in the embodiment of FIG. 21.

FIG. 22 shows resistor R3 inside connector 2010 of the panel. This arrangement ensures that +Vout is only influenced in the presence of a panel 2000 and resistor R3 to count. However, other arrangements could be used. By way of non-limiting example, referring now to FIG. 23, resistor R3 could be in an intermediate connector 2302 that can be inserted between connectors 2010 and 2020, and each of connectors 2010 and 2020 may have a different number of contacts to address that environment (in this embodiment connector 2010 has 4 contacts, while connector 2020 has 6 contacts, although the invention is not so limited). Another example would be to place R3 in connector 2020 of cable 2012, although as a practical matter this would potentially neutralize the ability to count the panels (R3 would indicate the presence of a panel regardless of whether panel 2000 was connected). Another example would be to place resistor R3 somewhere else in panel 2000.

Figure 24:
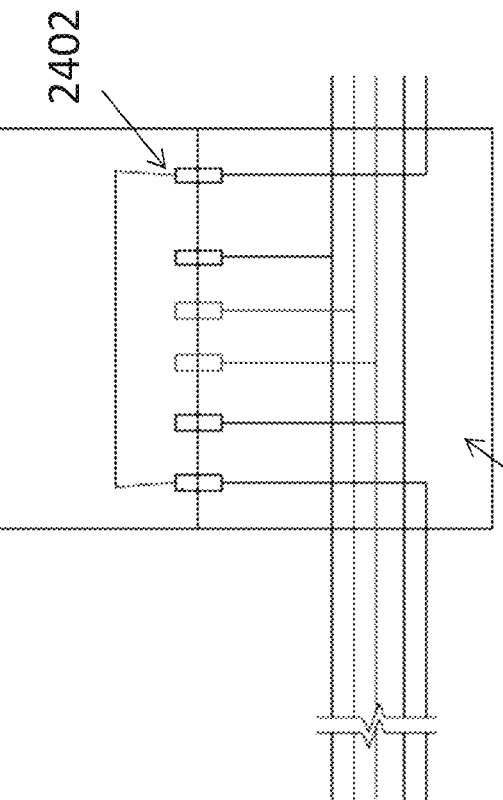
FIG. 24 illustrates the embodiment of FIG. 22 with an end cap.

As noted above, in a parallel configuration, not every connector 2020/2022 needs be connected to a panel, and end cap 2024 closes off an electrical connection of any unused connectors 2020/2022; failure to include and properly install the end cap may present a failure/safety hazard due to water entering the electrical system. Referring now to FIG. 24, this is represented by an end cap 2024 being mounted on the shown connector 2022. The end cap has a wire pathway 2406 within end cap 2024 to maintain the closed loop of signal pathway 2106 and return pathway 2108. No resistor need be provided with end cap 2024 (which differs from end cap 1314 in the series embodiment above).

Figure 25:
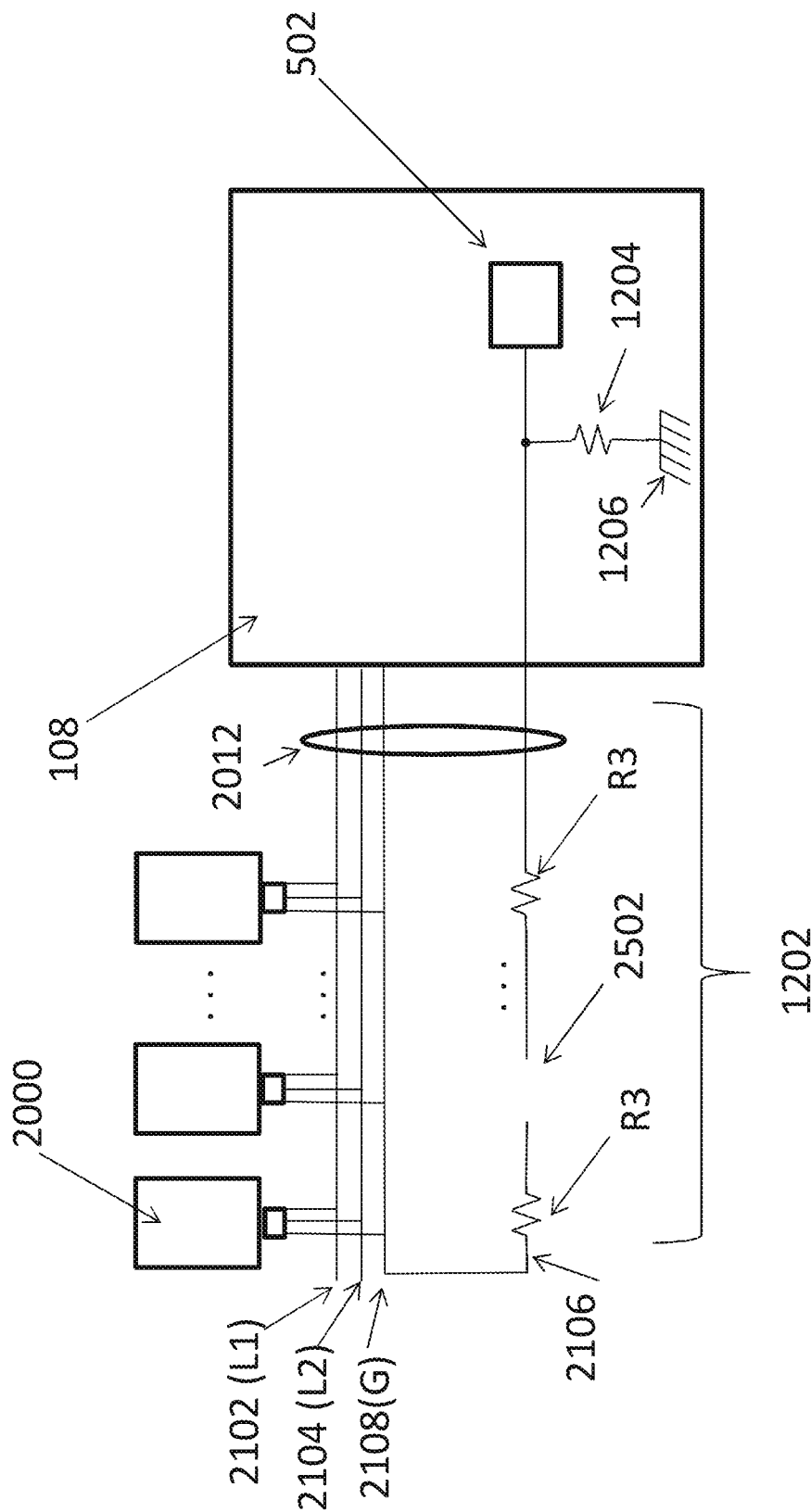
FIG. 25 illustrates the embodiment of FIG. 21 with a break in the electrical pathway.

By incorporating a bridging wire pathway 2406 into end cap 2024, the system can detect the proper/improper installation of end cap 2402. Specifically, if the end cap is missing, then the series pathway of signal pathway 2106 and return pathway 2108 will have a break 2502 as shown in FIG. 25. The open circuit will set +Vout at zero volts, which smart station 108 will interpret as an uncapped end of cable 2012.

The various resistors discussed above may be single or multiple resistors that collectively form a resistance as noted. Other circuit elements other then resistors may also be present, and in theory may form part of the voltage divider.

While the above embodiments are based on counting panels via a voltage divider, counting may also be based on capacitance. Specifically, each panel 102/1300/2000 has capacitors that provide clean power. The capacitance of the panels is a known/calculable quantity, and as such the initial current draw of each panel is a known/calculable quantity. A methodology for counting panels according to an embodiment of the invention is to leverage this capacitive current draw to count the number of panels.

Figure 26:
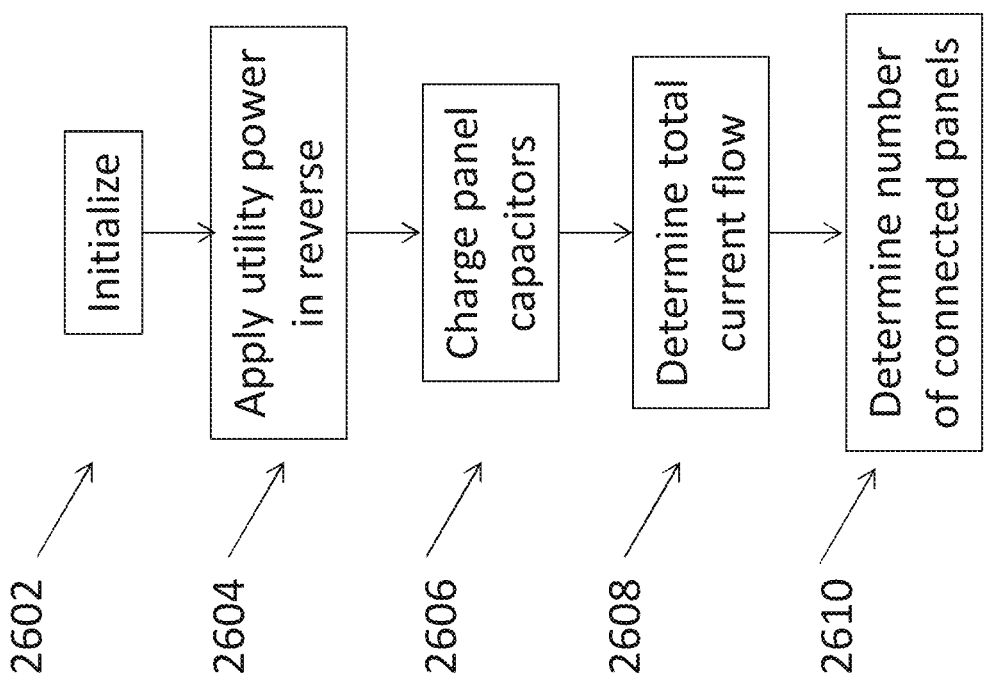
FIG. 26 illustrates a flowchart of another embodiment of the invention relating to capacitive current draw based counting.

Referring now to FIG. 26, the capacitive methodology commences at an initialization 2602, at which time the panels have been inactive such that any capacitors therein have discharged. At 2604 smart station 108 applies utility power in reverse from the home load center 110 to the panels. At 2606 the capacitors in the panels draw a current and begin to charge. At 2608 smart station 108 determines the amount of current needed to charge the capacitors. At 2610, smart station 108 calculates the number of connected panels by a table or formula that applies the known current draw per panel and the total current draw. A none limiting example of such a formula is:

Number of panels=total current draw/known current draw per panel

The resistance and capacitive counting methodologies may have relative advantages and disadvantages. Both are highly accurate counting methodologies and can be used separately. The resistance based methodology calls for supporting cabling and/or panel architecture as discussed herein, whereas a capacitance based methodology could operate with conventional panels and cabling. The resistance based methodology can be implemented before utility power is even connected and can be run during installation or at any time after installation (e.g., off internal power), whereas the capacitive methodology if preferably run when the panels are attached to utility power and the capacitors are discharged (e.g., at night). Since a feature of embodiments of the invention is to count panels as part of the installation process (e.g., before utility power is connected), the resistance methodology is more conducive for the same compared to the capacitive methodology. Both methodologies may be employed, in which case the smart controller can disable power if the two methodologies produce different panel counts.

Smart station 108 may be informed in advance of the number of panels 102 that will or should be connected to it. Smart station 108 can compare this number against the detected number, and inform the installer of a discrepancy. Smart station 108 could also disable the flow of power from the panels 102 until the discrepancy was resolved.

Figure 27:
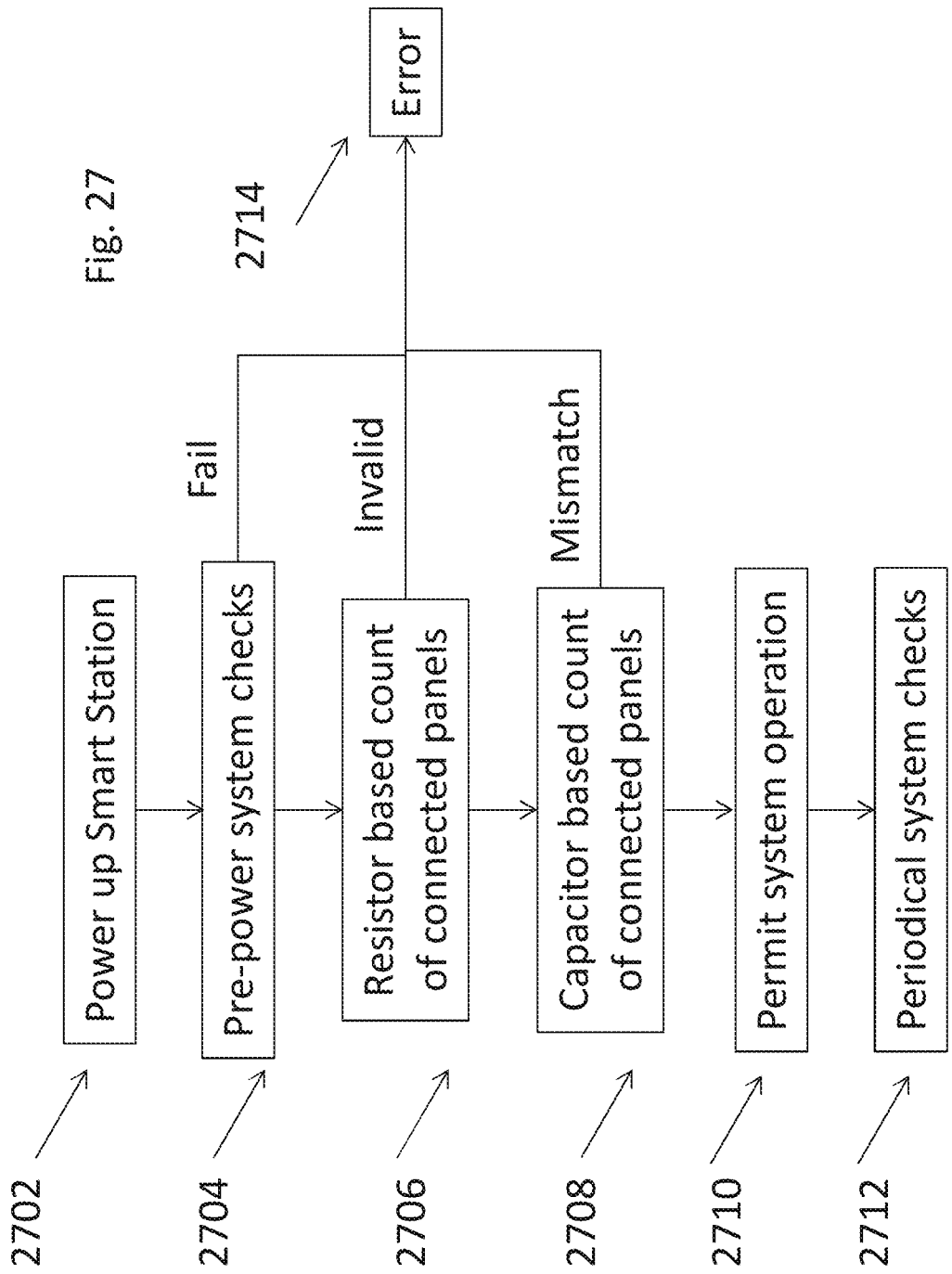
FIG. 27 illustrates a flowchart of another embodiment of the invention relating to startup of the smart station.

Referring now to FIG. 27, an embodiment of a startup method for smart station 108 is shown. At 2702 the various panels are connected and smart station 108 is engaged. At 2704 various pre-utility power checks are conducted to confirm system parameters are within tolerable limits, such as temperature, voltage, frequency, absence of ground fault, etc. If the system fails any such test than error protocols (e.g., notify the installer) are initiated at 2714. If all system checks are clear, the number of panels is counted at 2706. If the count indicates a problem (e.g., too many panels for system to handle, mismatch with pre-entered number of panels, missing end cap, break in electrical pathway), then error protocols at 2714 are initiated. In the absence of a problem, the number of panels is counted by the capacitive current draw method at 2708. Error protocols are initiated if the counts do not match, otherwise the smart station 10 enables power at 2710 and allows the system to operate.

Once in operation, smart station 108 will periodically conduct various system checks, including but not limited to any or all of the checks described in connection with FIG. 27; failure of any system check may result in smart station 108 disabling the flow of utility power as described herein. The invention is not limited to the order of FIG. 27, as the steps can be juxtaposed in whole or in part.

Figure 28:
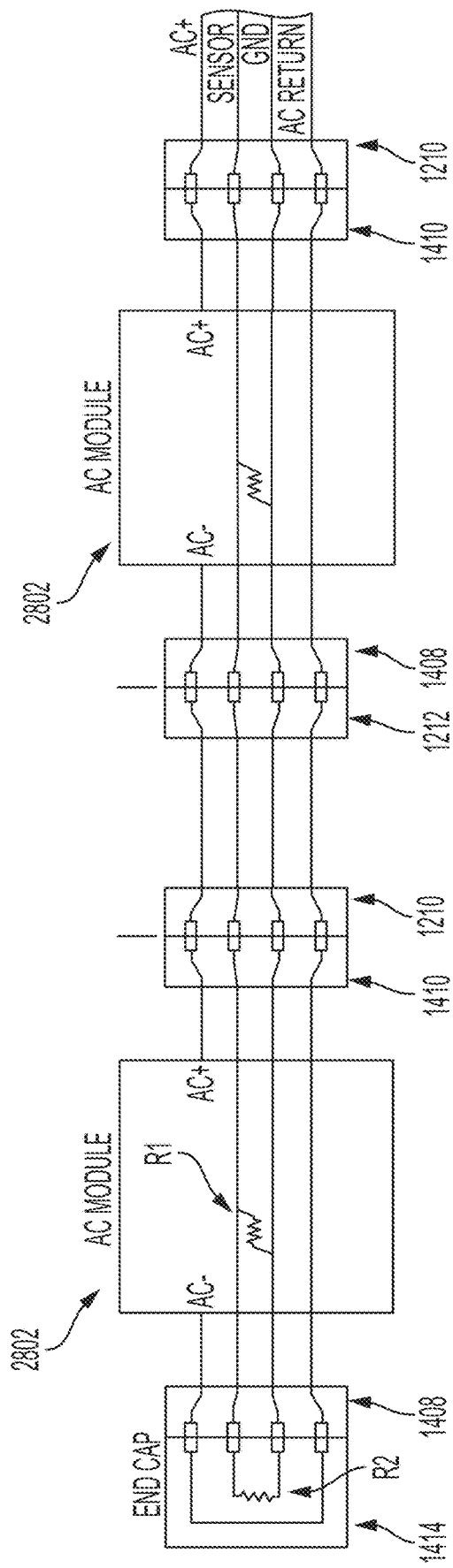
FIG. 28 illustrates another embodiment of the invention of a daisy chain connection of modules.

Referring now to FIG. 28, another embodiment of the invention is shown, in this case an embodiment of a daisy chain connection of modules 2800 in which the power from the modules are provided in series. The supporting architecture and counting methodology is consistent with that described with respect to FIGS. 13-19, and in particular FIG. 19 in which the resistor R1 is located within the module 2800 and resistor R2 in which and for which like numerals represent like components. The two power pathways L1 and L2 in FIGS. 13-19 are shown in FIG. 28 as AC+ and AC return. Each module 2800 has an AC+ and AC− terminal connected in series, which in turn connects to the AC return line through end cap 1414 to define the closed circuit power pathway.

Figure 29:
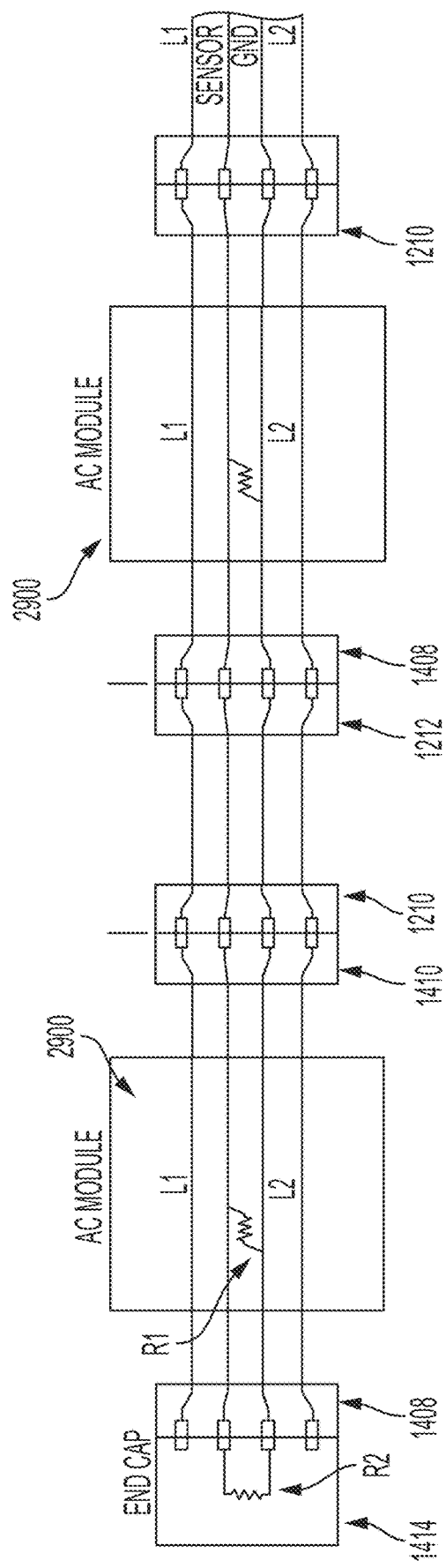
FIG. 29 illustrates another embodiment of the invention of a daisy chain connection of modules.

Referring now to FIG. 29, another embodiment of the invention is shown, in this case an embodiment of a daisy chain connection of modules 2900 in which the power from the modules are provided in a series circuit. The supporting architecture and counting methodology is consistent with that described with respect to FIGS. 13-19 and in particular FIG. 19 in which the resistor R1 is located within the module 2900, and for which like numerals represent like components. The two power pathways L1 and L2 provide parallel pathways for receiving power from modules 2900, although they are not connected by end cap 1414.

The number of connected panels 2800/2900 is counted in the same manner as discussed above with respect to FIGS. 13-19, and the various resistor values discussed with reference to Table 1 may be used in these embodiments, although the invention is not limited thereto. Breaks in the cable and/or a missing end cap are similarly detected as discussed above.

Figure 30:
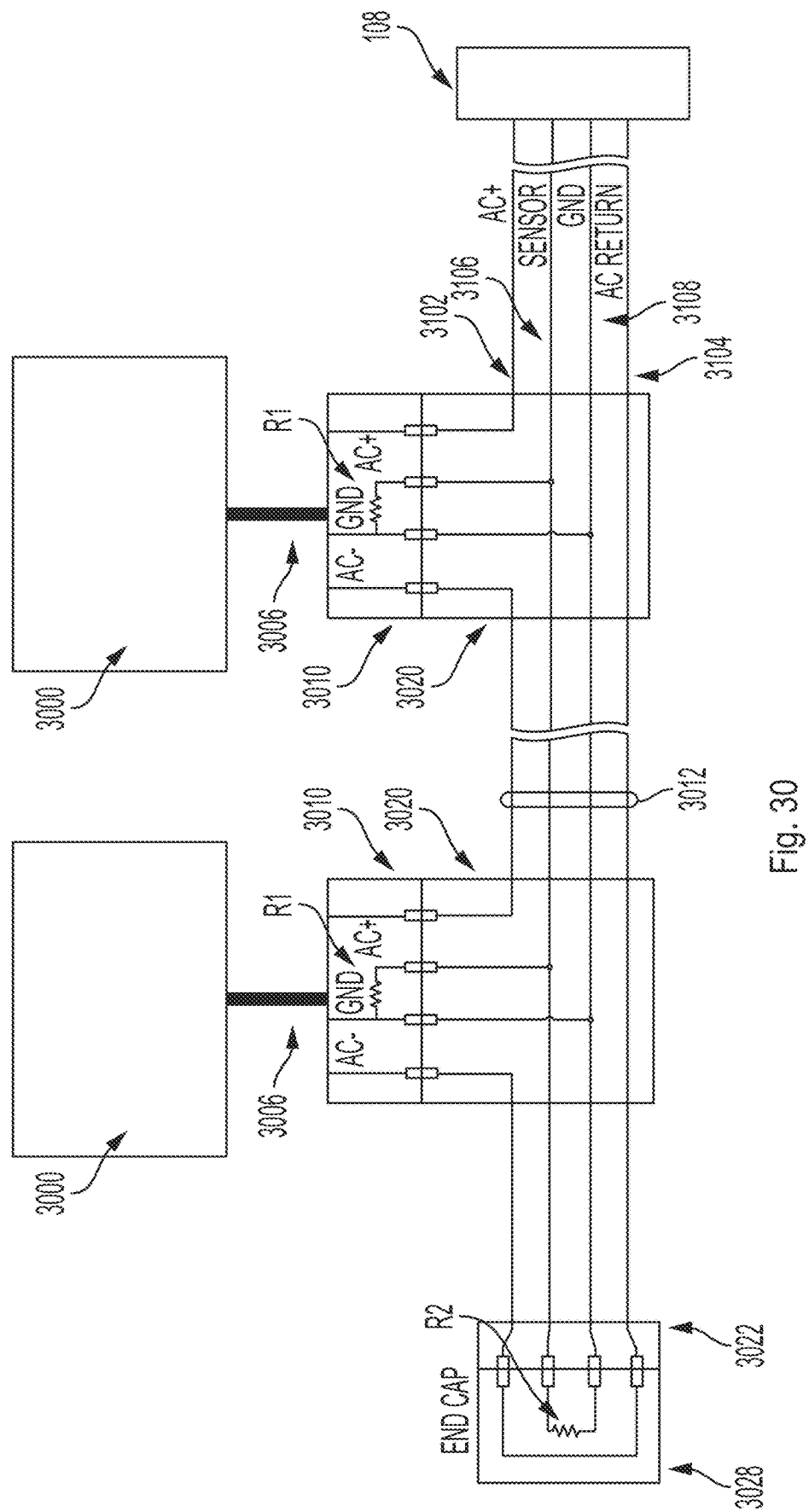
FIG. 30 illustrates another embodiment of the invention of a trunk branch connection of modules.

Referring now to FIG. 30, another embodiment of the invention is shown, in this case an embodiment of a trunk branch connection of modules 3000 connected electrically in series, each via a connector 3010 and a cable 3006. A cable 3012 connects at one end to smart controller 108. Connectors 3020 are placed along the length of cable 3012 with a last connector 3022 at the distal end that provides the option to connect additional segments of cable 3012 (e.g., two segments of cable 3012 with 5 connectors 3020 each to support 5 modules 3000 can connect together via connector 3022 to form a 10 connector cable 3012). Last connector 3022 has a different shape than connector 3020 such that it would only connect with another segment of cable 3012 and not accidentally connect with a module 3000.

Cable 3012 preferably includes at least 4 pathways, which are preferably conductors. Pathways 3102 (AC+) and 3104 (AC return) form the overall pathway for utility power generated by the solar panels 3000 to transmit to the smart station 108 for ultimate transmission to the home load center 110; both pathways 3102 and 3104 are in series with the panels 3000 and connected in a known manner not discussed further herein. Pathway 3106 (sensor) is a signal pathway and preferably carries a low voltage signal (e.g., 5 volts or less). Pathway 3108 (ground) is a return pathway that may combine with signal pathway 3106 to form a circuit to apply a low voltage signal (e.g., 5 volts or less). Return pathway 3108 can also act as a pathway to discharge current from a ground fault.

A resistor R1 is provided for each panel 3000 and a resistor R2 is provides in each end of line cap 3028 as a series circuit element in signal pathway 3106. A resistor R1 is provided for each panel 3000 as a parallel circuit element between pathways 3106 and 3108; preferably each resistor R1 is identical, but this need not be the case. A resistor R2 is provided in parallel with pathways 3106 and 3108 within each end of line cap 3028 as may be present. Resistances R1 and R2 are preferably different, and more particular at least 15 times different.

As discussed herein, the number of connectors 3020 may equal the number of panels 3000, and if there are fewer panels 3000 than connectors 3020 then each unused connector 3020 has a mounted end cap (not shown in FIG. 30) such as discussed in other embodiments herein. The absence of an end cap would leave an open circuit is the series power pathway, such that at least the lack of power flow would indicate an uncapped/unconnected connector 3020. Preferably such an end cap would provide an internal pathway from the AC+ to the AC− terminal to preserve the series power pathway (similar to end cap 2024 discussed above). For counting purposes, the end cap could also have no connection between the ground and sensor pathway similar to end cap 2024, or bridge the two pathways with a resistor similar to end cap 1414.

In the embodiments of FIGS. 28-29, the combination of resistor R2 and as many R1s as may be present form the collective resistance 1202, which can be calculated using standard equations as are known in the art. Based on the number of panels 3000 and corresponding number of resistors R1 present, the voltage divider of smart station 108 will produce a particular output +Vout that smart station 108 can convert into a panel count, such as by comparing the particular +Vout to a data table of expected +Vout values. The resistor values used in connection with Table 1 would yield the same results for the embodiments of FIGS. 28 and 29.

The embodiment of FIG. 30 would yield similar results for all connectors 3022 of the trunk occupied by modules 3000 and end of line connector 3022 capped by end of line cap 3028, although as noted above there may be additional combinations to account for end caps of missing panels. Consistent with other embodiments, resistor values selected for that environment would establish non-overlapping ranges of expected +Vout from the voltage divider such that a particular combination of panels/end caps could be identified from the resulting +Vout.

Several of the above counting methodologies are specific to series or parallel connections of panels, be it daisy chain or trunk cable. However, the invention is not so limited, and hybrids may also by, e.g., leveraging a balance of the various resistances to generate particular +Vout that is discernible to particular combination/layout of panels and related components.

Various embodiments herein relate to daisy chain and truck branch systems. However, the invention is not so limited, and other systems may be used.

Several of the above methodologies disclose counting the number of panels along a particular electrical pathway. As shown for example in FIG. 1, there may be multiple pathways. The embodiments herein may count the panels on the individual pathways and combine the data to apply as dictated by other needs of the system.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A solar panel system, comprising:
a plurality of solar panels, each panel having an associated passive element that is configured to modulate a signal, each panel configured to generate utility power and to transmit information including the signal as modulated by the passive element, the information being distinct from the utility power;
an input connector, configured to receive the utility power from the solar panels and the information from the solar panels;
an output, configured to forward the utility power from the solar panels for end consumption;
a cable configured to connect to the plurality of solar panels and the input connector, and having a power pathway for passing the power to the utility input connector, and having a data pathway distinct from the power pathway, for passing the information to the input connector;
a controller comprising hardware in combination with software, the controller being programmed to:
first determine a total number of solar panels electrically connected to the input connector from modulated signals in the information received at the input connector;
second determine whether the total number of solar panels exceeds a predetermined threshold;
enable flow of power to the output in response to at least the determined total number of the solar panels to be within a first threshold; and
disable the flow of power in response to the total number of the solar panels counted by the controller is determined by the controller to exceed the first threshold.

2. The system of claim 1, wherein the passive element is a resistor.

3. The system of claim 1, wherein the passive element of each of the solar panels connected to the cable collectively modulate the signal to a different value.

4. The system of claim 3, wherein the different value is based upon how many solar panels are connected to the cable such that the first determine can identify how many solar panels from the different value.

5. The system of claim 2, the controller further being programmed to:
output a signal to a data pathway; and
receive, from the data pathway, a modulated version of the output signal as modulated by the passive elements in the solar panels;
wherein the first determine determines the total number of solar panels electrically connected to the input connector based on a value of the received modulated version of the output signal.

6. The system of claim 5, further comprising:
the controller stores a table of different values of predicted values of the modulated version of the output signal and corresponding known configurations of solar panels;
the first determine comprising matching the received modulated version of the output signal to a the predicted value of the modulated version of the output signal from the table to identify a matching number of panels.

7. A method for counting a number of solar panels connected to a controller, comprising:
- output from the controller a signal to a data pathway, the data pathway being distinct from a power pathway that collects utility power from any solar panels connected to the controller;
- receive at the controller, from the data pathway, a modulated version of the signal as modulated by passive elements in the solar panels;
- first determine a total number of solar panels electrically connected to the controller from the received modulated signals;
- second determine whether the determined total number of solar panels exceeds a predetermined threshold;
- enable flow of power to the output in response to at least the total number of the solar panels counted by the controller is determined by the controller to be within a first threshold; and
- disable the flow of power in response to at least the total number of the solar panels counted by the controller is determined by the controller to exceed the first threshold.

8. The method of claim 7, wherein the passive element is a resistor.

9. The method of claim 7, wherein the passive element of each of the solar panels is identical.

10. The method of claim 7, further comprising:
- modulating, by a collective effort of the passive element of each of the solar panels, the signal to a different value.

11. The method of claim 10, wherein the different value is based upon how many solar panels are connected to the controller such that the first determine can identify how many solar panels from the different value.

12. The method of claim 11, further comprising:
- storing a table of different values of predicted values of the modulated version of the output signal and corresponding known configurations of solar panels;
- wherein the first determine determines the total number of solar panels electrically connected to the controller based on a value of the received modulated version of the output signal.

* * * * *